US012423768B2

(12) United States Patent
Saluja et al.

(10) Patent No.: US 12,423,768 B2
(45) Date of Patent: Sep. 23, 2025

(54) GENERATING THREE-DIMENSIONAL GRAPHICAL DATA BASED ON TWO-DIMENSIONAL MONOCULAR CAMERA SENSOR DATA

(71) Applicant: Bonsai Robotics Inc., Santa Cruz, CA (US)

(72) Inventors: Kunal Saluja, Santa Cruz, CA (US); Rachit Aggarwal, Santa Cruz, CA (US); Ugur Oezdemir, Santa Cruz, CA (US); Duane Needham, Santa Cruz, CA (US); Tyler Niday, Santa Cruz, CA (US)

(73) Assignee: Bonsai Robotics Inc., San Jose, CA (US)

( * ) Notice: Subject to any disclaimer, the term of this patent is extended or adjusted under 35 U.S.C. 154(b) by 147 days.

(21) Appl. No.: 18/108,064

(22) Filed: Feb. 10, 2023

(65) Prior Publication Data
US 2024/0273665 A1  Aug. 15, 2024

(51) Int. Cl.
*G06T 1/00* (2006.01)
*A01D 46/00* (2006.01)
*G06T 15/00* (2011.01)

(52) U.S. Cl.
CPC ............ *G06T 1/0014* (2013.01); *A01D 46/00* (2013.01); *G06T 15/005* (2013.01)

(58) Field of Classification Search
CPC ......... G06T 1/00; G06T 15/00; G06T 15/005; A01D 46/00
See application file for complete search history.

(56) References Cited

U.S. PATENT DOCUMENTS

| | | | | |
|---|---|---|---|---|
| 10,762,650 | B1* | 9/2020 | Guo | G06T 5/00 |
| 2018/0137357 | A1* | 5/2018 | Margalit | G06V 20/188 |
| 2020/0286282 | A1* | 9/2020 | Grant | G06V 20/647 |
| 2021/0000006 | A1* | 1/2021 | Ellaboudy | A01B 69/008 |
| 2022/0343593 | A1* | 10/2022 | Pourreza | G06V 10/751 |

* cited by examiner

*Primary Examiner* — Tan Q Nguyen
(74) *Attorney, Agent, or Firm* — Fenwick & West LLP

(57) ABSTRACT

The disclosure includes embodiments for an analysis system. A method according to some embodiments is executed by a graphics processing unit. The method includes generating input data including image data captured with a monocular camera operating in a field environment wherein the image data describes a two-dimensional image of the field environment. The method includes analyzing the input data to generate output data describing a three-dimensional graphic of the field environment depicted in the two-dimensional image. In some embodiments, the output data localizes objects, such as a mobile field device upon which the monocular camera is mounted, within the field environment. In some embodiments, the output data localizes any tangible object located within the field environment with an accuracy that satisfies a threshold for accuracy. The method includes modifying an operation of an autonomous control system of a mobile field device based on the output data.

18 Claims, 10 Drawing Sheets

Threshold Data 169

| Required Part | Required Quantity | Required Specification |
|---|---|---|
| Monocular Camera 126 | 1-10 (e.g., 1-10 monocular cameras) | 1 MP - 50 Megapixel<br>red-green-blue (RGB), infrared (IR), red-green-blue-infrared (RGB-IR), short-wave infrared (SWIR), red-green-blue with near-infrared cutoff filter (RGB/w NIR CUT)<br>Global or Rolling Shutter<br>20HFOV - 180 HFOV (horizontal field of view)<br>All ingress protection (IP) ratings: protection against solids (dust) and liquids (water) |
| Graphical Processing Unit (e.g., Onboard Unit 139) | 1-4 | 4-1000 tera operations per second (TOPS) |
| Cable (e.g., Bus 121) | 1-10 | 0.1 meters - 20 meters |
| Router (e.g., Communication Unit 145) | 1 | LTE/3G/4G/5G<br>Point to point / Mesh<br>> 2 megabytes per second (mbps) data bandwidth |

Figure 6

Review of Emission Factors (EF) for Almond Harvesting Operations and Other Crops

| | PM₁₀ Emission Factor | Old (2005-2012) | | New EF (2012) | |
|---|---|---|---|---|---|
| Operation | lbs/acre | kg/hectare | lb PM₁₀/acre/yr | kg PM₁₀/km²/yr |
| Shaking | 0.37 | 0.415 | 3.47 | 390 |
| Sweeping | 3.7 | 4.15 | 4.15 | 466 |
| Harvest | 36.7 | 41.2 | 23.60 | 2,650 |
| Total | 40.8 | 45.8 | 31.2 | 3,506 (vs 4,580) |

| Agricultural Operation | lb PM₁₀/acre/yr | vs Almond |
|---|---|---|
| Cotton Harvesting | 3.4 | 9.2x |
| Wheat Harvesting | 5.8 | 5.4x |

Figure 8

GENERATING THREE-DIMENSIONAL GRAPHICAL DATA BASED ON TWO-DIMENSIONAL MONOCULAR CAMERA SENSOR DATA

BACKGROUND

The specification relates to generating three-dimensional graphical data based on two-dimensional monocular camera sensor data.

Modern farm equipment broadcast wireless messages that include digital data describing their locations, speeds, headings, past actions, and future actions, etc. Farm equipment that broadcast wireless messages are referred to as "transmitters." Farm equipment that receives the wireless messages are referred to as "receivers." The digital data that is included in the wireless messages can be used for various purposes including, for example, the proper operation of onboard systems which are included in the receivers.

SUMMARY

Embodiments of an analysis system described herein operates independent of transmitting and receiving the digital data described in the preceding paragraph.

Modern farm equipment includes control systems. An example of a control system includes the control subsystem described below. The autonomous control system described herein is an example of a control system that includes numerous benefits based on the output data described herein. In some embodiments, the autonomous control system described herein includes a collection of control subsystems which provide sufficient control of the farm equipment so that the farm equipment is rendered autonomous and/or operable as an unmanned drone. The control subsystems include code and routines, and optionally hardware, which are operable to control the operation of some or all of the systems of the farm equipment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method which includes: generating, by a processor, input data including image data captured with a monocular camera operating in a field environment where the image data describes a two-dimensional image of the field environment; analyzing the input data to generate output data describing a three-dimensional graphic of the field environment depicted in the two-dimensional image, and modifying an operation of an autonomous control system of a mobile field device (e.g., farm equipment) operating in the field environment based on the output data. Other embodiments of this aspect include corresponding computer systems, apparatus, and computer programs recorded on one or more computer storage devices, each configured to perform the actions of the methods.

Implementations may include one or more of the following features. The method where the mobile field device is selected from a group that includes: a tree shaker; a tractor; a harvester; a topper; a harvest conditioner; a harvest trolley; a sweeper; a mower; a spreader; a sprayer; and a preconditioner. The field environment includes an orchard. The orchard includes at least one row of trees and a path for the mobile field device to operate within and the output data informs the autonomous control system how to operate within the path without intersecting the trees. In some embodiments, the row of trees includes a canopy and the output data informs the autonomous control system how to operate within the path without intersecting the trees or the canopy. The monocular camera includes a 1-to-50-megapixel image sensor. The processor includes a graphical processor unit. The graphical processing unit is operable to process 4 to 1,000 tera operations per second. In some embodiments, the graphical processing unit processes more than 1,000 tera operations per second. The method is executed by a software module that is certified by a third party to operate using input data generated by the monocular camera which includes a 1-to-50-megapixel image sensor, and the software module is certified by the third party to process the image data to generate the output data when executed by a graphical processing unit that is operable to processor 4-to-1,000 tera operations per second. The output data is certified to satisfy a threshold for accuracy for describing geographic locations of one or more objects within the field environment. The graphic does not include a picture of mobile field device 123 as it appears in real-life. Implementations of the described techniques may include hardware, a method or process, or computer software on a computer-accessible medium.

One general aspect includes a system that includes a non-transitory memory; and a processor communicatively coupled to the non-transitory memory, where the non-transitory memory stores computer readable code that is operable, when executed by the processor, to cause the processor to execute steps including: generating input data including image data captured with a monocular camera operating in a field environment where the image data describes a two-dimensional image of the field environment; analyzing the input data to generate output data describing a three-dimensional graphic of the field environment depicted in the two-dimensional image; and modifying an operation of an autonomous control system of a mobile field device operating in the field environment based on the output data. Other embodiments of this aspect include corresponding computer systems, apparatus, and computer programs recorded on one or more computer storage devices, each configured to perform the actions of the methods.

Implementations may include one or more of the following features. The system where the mobile field device is selected from a group that includes: a tree shaker; a tractor; a harvester; a topper; a shaker; a harvest conditioner; and a harvest trolley. The field environment includes an orchard or a vineyard. The orchard includes at least one row of trees and a path for the mobile field device to operate within and the output data informs the autonomous control system how to operate within the path without intersecting the trees or damaging irrigation equipment installed in the orchard. The row of trees includes a canopy and the output data informs the autonomous control system how to operate within the path without intersecting the trees or the canopy. Similarly, the vineyard includes rows of grapevines and a path for the mobile field device to operate within so that the grapevines and irrigation equipment installed in the vineyard. The monocular camera includes a 1-to-50-megapixel image sensor. The processor includes a graphical processor unit. The graphical processing unit is operable to processor 4-to-1,000 tera operations per second. Implementations of the described techniques may include hardware, a method or process, or computer software on a computer-accessible medium.

One general aspect includes a computer program product including computer code stored on a non-transitory memory that is operable, when executed by a processor, to cause the processor to execute steps including: generating input data including image data captured with a monocular camera operating in a field environment where the image data describes a two-dimensional image of the field environment; analyzing the input data to generate output data describing a three-dimensional graphic of the field environment depicted in the two-dimensional image, and modifying an operation of an autonomous control system of a mobile field device operating in the field environment based on the output data. Other embodiments of this aspect include corresponding computer systems, apparatus, and computer programs recorded on one or more computer storage devices, each configured to perform the actions of the methods.

BRIEF DESCRIPTION OF THE DRAWINGS

The disclosure is illustrated by way of example, and not by way of limitation in the figures of the accompanying drawings in which like reference numerals are used to refer to similar elements.

FIG. 6 is a block diagram illustrating an example of threshold data according to some embodiments.

FIG. 8 is a block diagram illustrating an example of environmental factors affecting the quality of sensor data recorded by a monocular camera according to some embodiments.

DETAILED DESCRIPTION

Figure 1:
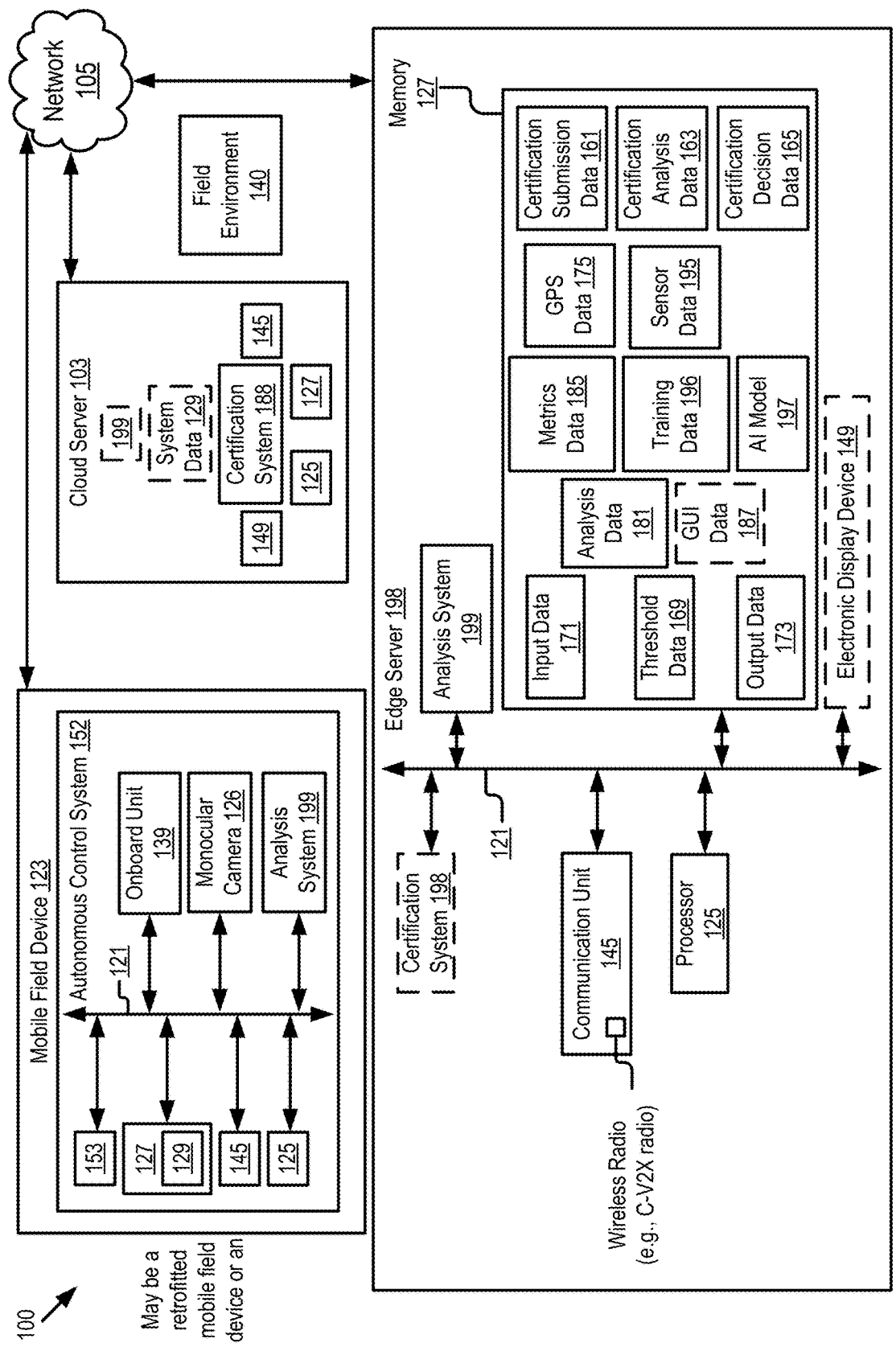
FIG. 1 is a block diagram illustrating an operating environment for an analysis system according to some embodiments.

Described herein are embodiments of an analysis system. The functionality of the analysis system is now introduced according to some embodiments. The analysis system is useful in many contexts, including retrofitting mobile field device used in the farming industry so that this mobile field device has autonomous control capabilities.

Mobile field devices include various types of farm equipment such as: a tree shaker; a tractor; a harvester; a topper; a harvest conditioner; a harvest trolley; a sweeper; a mower; a spreader; a sprayer; and a preconditioner. The availability of mobile field devices having autonomous control capabilities is a recent advent in the farming industry. Most mobile field devices in use today do not have autonomous control capability. As a used herein, the term "legacy mobile field device" refers to a mobile field device having no autonomous control capability. Legacy mobile field devices are undesirable because they require a human operator or other human intervention which leads to significant additional costs and smaller margins when compared to farms that are operated using mobile field devices with autonomous control capabilities. As used herein, the term "upgraded mobile field device" refers to any mobile field device having autonomous control capabilities. Farmers would like to replace their legacy mobile field devices with upgraded mobile field devices since doing so represents significant long-term cash savings, increased production time, and increased profitability.

Mobile field devices represent a significant investment by farmers. Nut farmers (e.g., almond, walnut, pistachio, etc.), in particular, may experience small margins and not have access to extra money needed to replace their legacy mobile field devices with upgraded mobile field devices. Accordingly, there is a conflict between the need to transition to upgraded mobile field devices in order to increase profitability and these farmers not having enough capital on hand to purchase upgraded mobile field devices.

One approach to solving this conflict is to retrofit a legacy mobile field device with a relatively inexpensive autonomous control system that includes everything needed to transform the legacy mobile field device to an upgraded mobile field device. Described herein are embodiments of such an autonomous control system. In some embodiments, the autonomous control system is an element of a legacy mobile field device that is upgraded by installation of the autonomous control system so that the legacy mobile field device is transformed to an upgraded mobile field device (e.g., a "retrofitted mobile field device"). In such embodiments, the autonomous control system may be an element of a kit that is sold and used to retrofit legacy mobile field devices so that this equipment is upgraded to become retrofitted mobile field device.

In some embodiments, the autonomous control system described herein is included in mobile field devices at the time of their manufacture so that the autonomous control system is an element of an upgraded mobile field device at the time that the device is manufactured.

An example of the autonomous control system as described herein includes the autonomous control system 152 depicted in FIG. 1. In some embodiments, the mobile field device 123 depicted in FIG. 1 is a retrofitted mobile field device. In some embodiments, the mobile field device 123 is an upgraded mobile field device that is included in the mobile field device 123 at the time of manufacture. Either scenario is desirable because of the relatively low cost of the autonomous control system 152 when compared to the expense of the sensor hardware and the processing hardware which is currently used to manufacture existing upgraded mobile field devices. Accordingly, as used herein, the term "relatively low cost" refers to the cost of the hardware included in the autonomous control system 152 versus the cost of the hardware which is currently used to manufacture existing upgraded mobile field devices.

Figure 7:
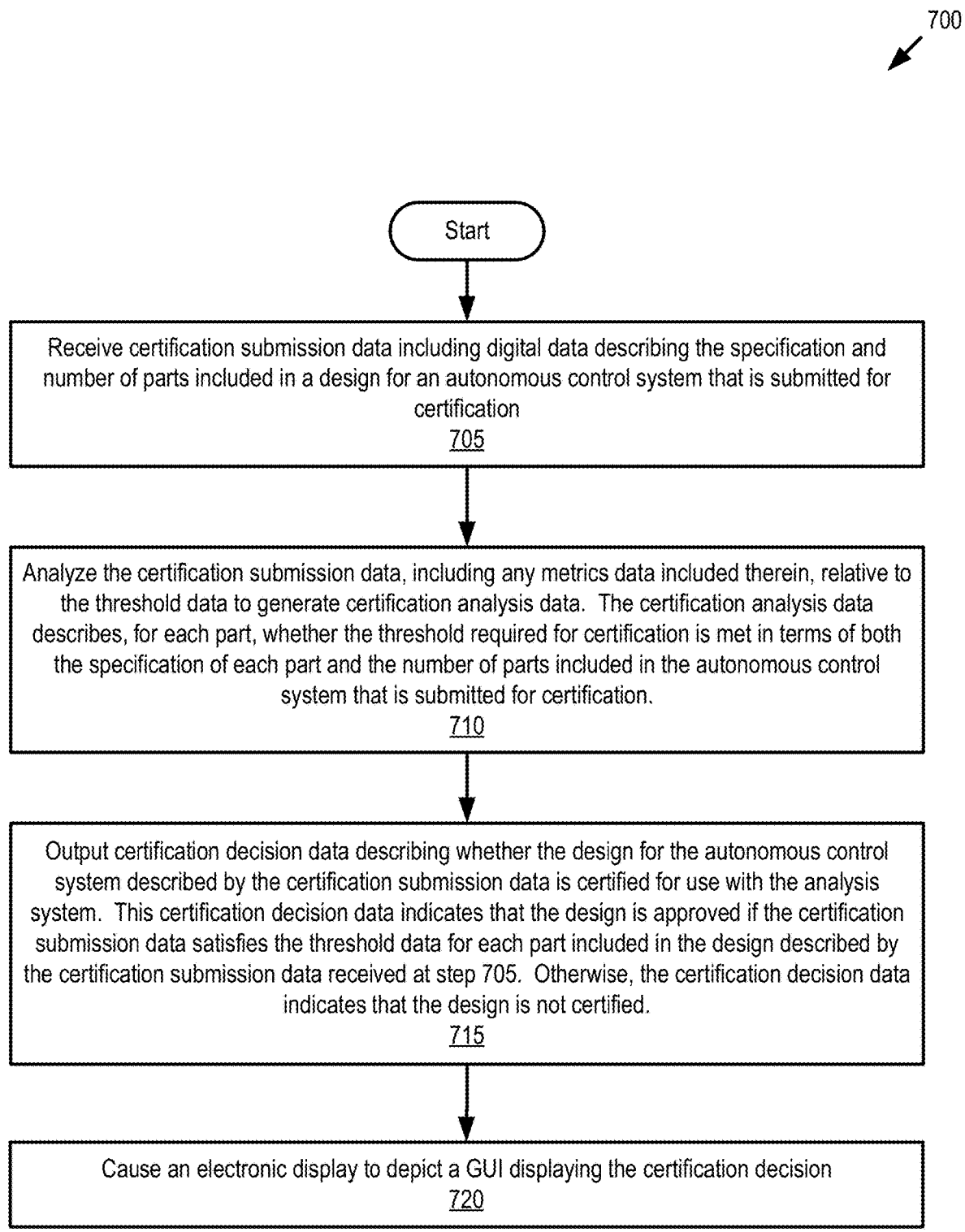
FIG. 7 is a flowchart of an example method for certifying an autonomous control system according to some embodiments.

In some embodiments, the autonomous control system 152 has a relatively low cost because it includes inexpensive hardware elements and fewer hardware elements when compared to the hardware which is currently used to manufacture existing upgraded mobile field devices. In some embodiments, the elements of the autonomous control system 152 and the specifications for these elements are included in the threshold data 169 depicted in FIG. 6. Also described herein are embodiments of a certification system that includes code and routines that are operable to analyze a design for a particular autonomous control system to determine whether the elements of this design meet the threshold requirements necessary to be certified for use with an analysis system described herein. An example of a method executed by this certification system is depicted in FIG. 7. In some embodiments, the certification system issues a certification if the design satisfies the threshold data 169 depicted in FIG. 6 and does not issue a certification if this threshold data 169 is not satisfied.

In some embodiments, the certification system beneficially generates a graphic describing whether or not a design is certified by the certification system. In some embodiments, the graphic is depicted as a graphical element within a graphical user interface (GUI). In some embodiments, the certification system is configured to display the GUI on an electronic display device. The electronic display device includes any electronic display device (e.g., element 149 depicted in FIG. 1) that is communicatively coupled to the certification system and configured to receive GUI data generated by the certification system, generate one or more GUIs based on the GUI data, and display the GUIs on the electronical display device. The GUI is an optional feature. In some embodiments, the certification system transmits digital data describing the decision without including graphical data for generating a GUI.

In some embodiments, a computer system (not pictured) includes an electronic display device 149, a communication unit 145 connected to the network 105, and an input peripheral (e.g., a keyboard) that is used to both upload the certification submission data 161 to the certification system 188 via the network 105 and receive and display GUI data displaying the outcome of their certification decision as described by the certification decision data 165 for their certification submission data 161. In this way designs are submitted to the certification system 188 (e.g., which is an element of the cloud server 103) via the network 103 and the electronic display device 149 displays the outcome of their certification decision based on their submission.

Examples of an electronic display device include one or more of the following: a touch screen; an electronic display; a heads-up display; and any other electronic display device. In some embodiments, the electronic display device is embedded in a surface of the mobile field device 123 such as a rear-view mirror, a side mirror, a windshield, etc. GUI data includes digital data that is operable to cause the electronic display device to generate a GUI. In some embodiments, the certification system generates the GUI data based on the outcome of the method 700 depicted in FIG. 7. An example of the electronic display device according to some embodiments includes the electronic display device 149 depicted in FIG. 1. In some embodiments, such as when the mobile field device is fully autonomous, the GUI data is presented via a remotely located tablet or a computer that is wirelessly connected to a network to receive the GUI data.

Threshold data includes digital data that describes any threshold described herein. An example of the threshold data includes the threshold data 169 depicted in FIG. 1.

A control subsystem is an onboard system of a mobile field device that controls the operation of a functionality of the mobile field device. Examples of the control subsystem according to some embodiments includes the control subsystem 153 depicted in FIGS. 1 and 2.

Example General Method

The example general method is described by reference to the example operating environment 100 depicted in FIG. 1. In some embodiments, the analysis system 199 includes code and routines that are operable, when executed by a processor 125, to cause the processor 125 to execute one or more steps of an example general method described herein. In some embodiments, the processor 125 is an element of an onboard unit 139. In some embodiments, the onboard unit 139 includes a graphical processing unit. Example specifications for the graphical processing unit are depicted in FIG. 6. The analysis system 199 may be an element of one or more of the following: a mobile field device 123; a cloud server 103; and an edge server 198 installed in a connected computing device (e.g., one having a communication unit 145 having access to a network 105 such as depicted in FIG. 1) located in a field environment 140 such as an orchard.

An example of the operating environment includes the operating environment 100 depicted in FIG. 1. As depicted in FIG. 1, an instance of the analysis system 199 is stored in the edge server 198 and an instance of the analysis system 199 is stored in the mobile field device 123. The mobile field device 123 includes, for example, farm equipment operating in a field environment 140 (e.g., a farm setting such as an orchard). The mobile field device 123 includes a monocular camera 126 having attributes that satisfy the threshold data 169. An example of the threshold data 169 for the monocular camera 126 are depicted in FIG. 6 according to some embodiments. The monocular camera 126 captures images and/or video of the mobile field environment 140. The sensor data 195 includes digital data that describes the images such that the sensor data 195 describes and/or depicts the field environment 140 (e.g., the orchard). The field environment 140 may include environmental factors that make it difficult for the images captured by the monocular camera 126 to accurately depict the reality of the field environment 140. For example, the environmental factors may include low light (a level of illumination that satisfies a threshold for insufficient light to record images that accurately depict the field environment 140), inclement weather (the presence of rain, snow, sleet, high speed wind that satisfies a threshold for inclement weather), high particulate content (a $PM_{2.5}$ or $PM_{10}$ that satisfies a threshold for high particulate matter (PM) within the air, and other environmental factors that are common to farm settings yet impair the functionality of monocular cameras 126 or otherwise cause the monocular camera 126 to record images that are less accurate than the monocular camera would generate when operating in the presence of better environmental factors. Examples of such environmental factors that are common in the field environment 140 are depicted in FIG. 8 for embodiments where the field environment 140 is an almond orchard.

In some embodiments, the sensor data 195 includes one or more artifacts or discrepancies because the monocular camera 126 captures the sensor data 195 in a field environment 140 that is adversely affected by one or more of the environmental factors. In some embodiments, the artifacts or discrepancies include one or more bits of data within the sensor data 195 that are modified or affected by the monocular camera 126 recording the sensor data 195 within the field environment 140 when the one or more environmental factors are present within the field environment 140. Accordingly, in some embodiments the one or more environmental factors adversely affects the collection of the sensor data 195 in such a way that the adverse effects are detectable within the sensor data 195 itself. In some embodiments, the analysis system 199 is specially configured for this limitation and includes one or more digital data filters that analyzes the sensor data 195, detects the one or more anomalies (e.g., the artifacts and/or discrepancies) within the digital data included in the sensor data 195, and modifies the sensor data 195 to remove or mitigate the presence of the one or more anomalies. In some embodiments, the modification of the sensor data 195 includes using an AI-based approach to approximate the correct bits of digital data that replace the anomalous bits of digital data. In some embodiments, this AI-based approach is informed by the training data described herein.

In some embodiments, the edge server 198 is an element of a stationary connected computing device (e.g., one having a communication unit 145 having access to a network 105 such as depicted in FIG. 1) located in the field environment 140. The stationary connected computing device has access to a source of electricity and is communicatively coupled to the network 105. The stationary connected computing device supports and or controls the operation of one or more mobile field devices 123 within the field environment to provide the autonomous control systems 152 of the one or more mobile field devices 123 with computational resources (e.g., increased computing power provided by the processor 125 of the edge server 198, storage capacity of the memory 127 of the edge server 198, and/or access to the network 105 or the increased bandwidth of the edge server 198) that enable the autonomous control systems 152 of the mobile field devices 123 to provide their functionality to improve the operation of the mobile field devices (e.g., by retrofitting the legacy mobile field devices 123 to function as upgraded mobile field devices 123 having autonomous control capability).

For example, in some embodiments, the autonomous control system 152 of the mobile field device 123 includes an analysis system 199. The analysis system 199 of the mobile field device 123 engages the onboard monocular camera 126 of the autonomous control system 152 to record sensor data 195. Optionally, the sensor data 195 may be formatted, transformed, or certified by the analysis system 199 to generate the input data 171. For example, the analysis system 199 may certify that the input data 171 includes a sufficient amount of images that are necessary to generate output data 173 based on the input data 171. As another example, in some embodiments, the file type of the sensor data 195 is reformatted from one file type (e.g., .jpg, .pdf, .tiff, .png, or some image file type) to another file type (e.g., .jpg, .pdf, .tiff, .png, or some image file type) so that the data is compatible with the code and routines of the analysis system 199 when generating output data. In yet another example, in some embodiments an AI model of the analysis system 199 only accepts inputs having a certain format and the sensor data 195 is modified by the analysis system 199 to satisfy this format in order to generate the input data 171.

In some embodiments, the sensor data 195 is formatted, transformed, or certified by an analysis system 199 of the edge server 198 instead of the analysis system of the mobile field device 123. In some embodiments, the autonomous control system 152 does not have the necessary computational power to generate the output data. In these embodiments, the analysis system of the mobile field device transmits the sensor data 195 (or the input data 171 if already formed) to the edge server 198 via a wireless message that is transmitted to the edge server 198 (see, e.g., step 315 of FIG. 3A) via the network 105. The analysis system 199 of the edge server 198 then analyzes the input data 171 using a trained AI model to generate the output data 173 (see, e.g., step 325 of FIG. 3B and FIGS. 4A, 4B, and 4C). The analysis system 199 of the edge server 198 then transmits a wireless message to the mobile field device 123 including the output data 173 so that the analysis system 199 of the mobile field device 123 is able to modify the operation of one or more control subsystems 153 of the autonomous control system 152 to provide autonomous control capability to the mobile field device 123.

In some embodiments, the computational power of the autonomous control system 152 is adequate to generate output data 173 so that it is not necessary for the analysis system 199 of the mobile field device to offload the sensor data 195/input data 171 to the analysis system 199 of the edge server 198 as described in the preceding paragraph in order to generate the output data 173.

In some embodiments, an operating environment may include a plurality of instances of the analysis system. In some embodiments, some or all of the code and routines of the analysis system are distributed across one or more endpoints of a network. For example, as depicted in FIG. 1, a mobile field device 123 includes an instance of the analysis system 199 and the edge server 198 includes an instance of the analysis system 199. The instance of the analysis system 199 included in the mobile field device 123 may include some or all of the possible code and routines described herein as included in the analysis system 199. The instance of the analysis system 199 included in the edge server 198 may include some or all of the possible code and routines described herein as included in the analysis system 199. For example, the analysis system 199 of the mobile field device 123 may be responsible for collecting sensor data 195, transmitting the sensor data 195 to the edge server 198, receiving output data 173 from the edge server 198, and implementing the output data 173 to modify the operation of one or more control subsystems 153 of the autonomous control system 152 to provide autonomous control capability to the mobile field device 123.

The control subsystem 153 is now described with reference to the output data 173 depicted in FIG. 4C. In some embodiments, a control subsystem 153 includes an onboard system. In some embodiments, where the control subsystem 153 controls the steering of a mobile field device 123, the analysis system 199 of the mobile field device 123 inputs the output data 173 to the control subsystem 153 which then controls the steering of the mobile field device 123 so that it operates within a designated path (e.g., the path depicted in FIG. 4C) and does not collide with any trees or other objects within the orchard (e.g., the trees and the rows depicted in FIG. 4C).

Steps of the example general method are now described. In some embodiments, these steps are executed by a processor or onboard unit of mobile field device 123. The mobile field device 123 is a connected device having a communication unit 145 and access to the network 105. In some embodiments, some of the steps of the example general method are executed by a processor of the edge server 198. The edge server 198 is a connected device having a communication unit 145 and access to the network 105. The edge server 198 and the mobile field device 123 transmit digital data to one another via wireless messages that are transmitted to one another directly or indirectly via the network 105.

As used herein, the term "wireless message" refers to a V2X message transmitted by a communication unit of a connected vehicle such as a remote connected vehicle or the mobile field device 123.

In some embodiments, one or more steps of the example general method are skipped or modified. The steps of the example general method may be executed in any order, and not necessarily the order presented.

In some embodiments, a plurality of endpoints of the network 105 include instances of the analysis system 199 and the analysis systems 199 of these endpoints also execute some or all of the steps described below. For example, one or more of these steps are executed by the mobile field device 123 in some embodiments. In some embodiments, a server such as a cloud server 103 or an edge server 198 includes an instance of the analysis system 199, and one or more steps of the example general method are executed by the analysis systems 199 of one or more of these endpoints.

The steps of the example general method are now described according to some embodiments.

Step 1: A processor 125 of the mobile field device 123 executes the analysis system 199 of the mobile field device 123 to cause the analysis system 199 to actuate the monocular camera 126. In this way, the analysis system 199 of the mobile field device 123 causes the monocular camera 126 of the mobile field device 123 to record sensor data 195. The sensor data 195 includes digital data that describes the images and/or video that are recorded by the monocular camera 126. In some embodiments, the individual images are time stamped so an instance of sensor data 195 describes both an image and when this image was recorded. In some embodiments, the sensor data 195 includes time data that describes the timestamps for the images.

Optionally, in some embodiments the mobile field device 123 includes a sensor set having various types of sensors that are actuated at step 1. This is not necessary since these images generated by the monocular camera 126 are sufficient for the analysis system 199 to generate the output data 173. The analysis system 199 causes some or all of the sensors included in the sensor set to record sensor measurements. In some embodiments, the sensor data 195 describes some or all of these sensor measurements. In some embodiments, the images described by the sensor data 195 describe one or more of the following types of digital data: the mobile field device 123 over time including its location in the field environment 140 over time; the location of the mobile field device 123 relative to other objects within the field environment 140 over time; a driver's operation of the mobile field device 123 over time, the presence of other objects over time within the field environment 140 that includes the mobile field device 123; the location of these objects in the field environment 140 over time relative to other objects (e.g., the location of these other objects relative to one another and relative to the mobile field device 123); the behavior of these other objects over time; the geometry of the field environment 140 over time; features in the field environment 140 over time and changes in one or more of their position, velocity, and acceleration; kinematic information about the mobile field device 123 and/or any objects in the field environment 140; and any aspect of the field environment 140 that is measurable by the sensors included in the sensor set of the mobile field device 123.

The sensors included in the sensor set, and the type of measurements they can record, are described in more detail below.

Step 2: A processor 125 of the mobile field device 123 executes the analysis system 199 of the mobile field device 123 to cause the analysis system 199 to generate sensor data 195 using the monocular camera 126.

Step 3: (Optional) A processor 125 of the mobile field device 123 executes the analysis system 199 of the mobile field device 123 to cause the analysis system 199 to build a wireless message including the sensor data 195 within the payload of the wireless message and use the communication unit 145 of the mobile field device 123 to transmit the wireless message including the sensor data 195 to the edge server 198 via the network 105. This step is an optional step. In some embodiments, the method is executed entirely onboard the mobile field device 123. For example, in some embodiment the analysis system 199 of the mobile field device 123 includes sufficient computing resources onboard the mobile field equipment to execute the example general method without need to transmit the sensor data 195 to an edge server 198.

The following steps assume that the mobile field device does not execute step 3 and instead executes the remaining steps of the example general method onboard the mobile field device 123. A method 300 depicted in FIGS. 3A and 3B assume that the mobile field device offloads steps of the method 300 to the edge server 198.

Step 4: A processor 125 of the mobile field device 123 executes the analysis system 199 of the mobile field device 123 to cause the analysis system 199 to generate input data 171 using the sensor data 195. In some embodiments, the input data 171 is the sensor data 195. In some embodiments, the analysis system 199 transforms, modifies, or certifies the sensor data 195 to generate the input data 171 at this step. In some embodiments, the analysis system 199 modifies (e.g., reformats) the sensor data to fit a particular format at this step. This modification may require some or all of the bits of data included in the sensor data 195 to be transformed. For example, in some embodiments an AI model 197 only accepts inputs having a certain format and the sensor data 195 is modified by the analysis system 199 at this step to fit this format in order to generate the input data 171. In some embodiments, the input data 171 includes digital data describing monocular image data depicting one or more two-dimensional images of the field environment 140 (e.g., two-dimensional images of an orchard captured by a monocular camera 126 such as the image depicted in FIG. 4B).

Step 5: A processor 125 of the mobile field device 123 executes the analysis system 199 of the mobile field device 123 to cause the analysis system 199 to analyze the input data using the AI model 197 to generate the output data. See, e.g., FIGS. 4A, 4B, 4C. The AI model 197 includes code and routines that are configured are trained using training data 196 and configured based on the training data 196 to receive the input data 171 as an input and generate the output data 173 based on the input data 171 and the training data 196. The output data 173 includes digital data describing one or more three-dimensional images that depict the geographic locations of objects (e.g., trees, obstacles, other machines) in the field environment 140 with an accuracy that satisfies a threshold for accuracy. The threshold for accuracy is described by the threshold data 169 in some embodiments. In some embodiments, the geographic locations included in the output data 173 are described relative to the mobile field device 123 that includes the monocular camera 126 that is used to generate the sensor data 195. In some embodiments, the output data describes not only the locations of objects around the mobile field device, but also the geographic location of the mobile field device itself. This is particularly advantageous in geographic locations where an open sky is not present for communication with GPS satellites or when GPS is otherwise inaccessible.

The AI model 197 and the training data 196 are described in more detail below according to some embodiments.

Step 5: The analysis system of the mobile field device 123 is executed by a processor of the mobile field device 123 to cause the analysis system 199 to modify the operation of the autonomous control system 152 or a control subsystem 153 of the mobile field device 123 based on the output data 173. In some embodiments, modifying the operation of the autonomous control system 152 (or the control subsystem 153) based on the output data 173 improves the operation of the autonomous control system 152 by ensuring that the mobile field device 123 does not collide with objects in the orchard (e.g., a row of trees, a canopy of the trees, etc.) while still performing a proper function of the mobile field device 123 (e.g., whatever function the mobile field device is designed to provide, such as shaking trees or harvesting crops). In some embodiments, modifying the operation of the autonomous control system 152 (or the control subsystem 153) based on the output data 173 improves the operation of the mobile field device 123 by providing the mobile field device 123 with autonomous control capability when the mobile field device 123 would not have autonomous control capability without the execution of the analysis system 199 to provide the output data 173 based on the images captured by the monocular camera 126.

The threshold data 169 includes digital data that describes any threshold described herein. The analysis data 181 describes the output of any step of any method, any sub-step of any method, or analysis described herein or implied by the descriptions provided herein. The sensor data 195 includes digital data describing any measurement recorded by any sensor described herein.

The GUI data 187 includes digital data that causes an electronic display device 149 to display a Graphical User Interface (GUI) depicting any information described herein. The electronic display device includes an electronic device that is communicatively coupled to receive the GUI data 187 and generate a GUI displaying any information described herein. For example, the GUI describes whether an analysis system 199 or autonomous control system 152 is certified by a certification system 188.

The certification system 188 includes code and routines that are operable, when executed by a processor 125 of the cloud server 103, to cause the processor 125 to execute one or more steps that are operable to determine whether a design for an autonomous control system 152 is certified to be compliant with the analysis system 199. For example, the certification system 188 causes the processor 125 to execute one or more steps of the method 700 depicted in FIG. 7. The design for an autonomous control system 152 includes a specification describing, among other things, one or more of the following: a description of which parts are included in the design (e.g., one or more monocular cameras, one or more graphical processing units, one or more cables, and one or more routers); a number describing, for each particular part, how many of these parts are included in the design; and metrics data 185 describing technical information about the performance capability of each part (e.g., how many megapixels are included in the image sensor of the monocular camera). FIG. 6 includes threshold data 169 describing, according to some embodiments, the specification necessary for a design to be certified by the certification system 188. The threshold data 169 includes a required specification for each part that is required to satisfy the threshold data. For example, a design is required to have at least one monocular camera 126 with an image sensor including 1 to 50 megapixels among other required specifications described in FIG. 6. If a design included in the metrics data 185 specifying a monocular camera whose image sensor is smaller than 1 megapixel or larger than 50 megapixels, then this entire design would be rejected since the required specification for the monocular camera is not met.

The certification submission data 161 includes digital data describing a design for an autonomous control system 152 that is submitted for consideration for receiving a certification from the certification system 188. The certification submission data 161 includes digital data describing: which parts are included in the design; a description of the number of parts included in the design (e.g., how many monocular cameras 126 are included in the design); and the metrics data 185 for the parts that are included in the design for the autonomous control system.

The metrics data 185 includes digital data describing, for each part included in the design described by the certification submission data 161, the technical performance of the part in terms that match the required specification included in the threshold data 169 (see, e.g., FIG. 6). For example, with reference to FIG. 6, since the required specification for the monocular camera 126 specifies that the performance of the image sensor of the monocular camera 126 be specified in terms of megapixels, the metrics data 185 include in any certification submission data 161 is required to specify the performance of the monocular camera 126 included in the design in terms of megapixels. If the metrics data 185 does not specify the technical performance of the image sensor in these terms, then the design is not certified by the certification system 188 and the GUI data 187 generates a GUI specifying the reason for rejection as a non-conforming certification submission data 161 (e.g., nonconforming with the threshold data 169 depicted in FIG. 6) for the monocular camera 126 part included in the design described by the certification submission data 161.

The certification analysis data 163 includes digital data describing, for each part included in the design described by the certification submission data 161, whether the threshold required for the certification is met in terms of both the specification of each part and the number of parts included in the design. For example, considering just the requirement that the design include a monocular camera 126, the certification analysis data 163 describes: whether the design includes a monocular camera 126, whether the design includes 1 to 10 monocular cameras (any more or less will result in a failure to certify); and whether each of the monocular cameras includes metrics data 185 that satisfies the required specification included in the threshold data 169 depicted in FIG. 6 (if the metrics data 185 for any one of these monocular cameras 126 is outside of the required specification, then the certification system 188 will not certify the design).

The certification decision data 165 includes digital data describing whether the design for the autonomous control system 152 described by the certification submission data 161 is certified for use with the analysis system 199. This certification decision data 165 indicates that the design is approved if the certification submission data 161 satisfies the threshold data 169 depicted in FIG. 6 for each part included in the design described by the certification submission data 161. Otherwise, the certification decision data 165 indicates that the design is not certified for use with the analysis system 199.

AI Model 197 and Training Data 196

In some embodiments, an Artificial Intelligence (AI) model 197 includes code and routines that perform two computational steps. The first computational step is to receive an instance of input data 171 and produce an instance of output data 173 based on the received instance of input data 171 and training data 196 that has previously trained the AI model 197. In some embodiments, the output data 173 outputted by the AI model 197 for a given instance of input data 171 includes an estimate of information not explicitly present in the input data 171 but derivable from the input data 171 by the code and routines of the AI model 197 based on information learned by the AI model 197 when analyzing (i.e., being trained by) the training data 196.

In some embodiments, the training data 196 includes thousands, millions, or billions of pictures of field environments 140 similar to the one that the mobile field device 123 is operating in at a present time. For example, if the mobile field device 123 is operating in an almond orchard, then the training data 196 includes millions of pictures taken by a historical monocular cameras mounted to a plurality historical mobile field device operating in one or more almond orchards. In some embodiments, the pictures included in the training data 196 may be taken by a plurality of historical mobile field devices operating in a plurality of different almond orchards. In some embodiments, the mounting location of the historical monocular cameras on the exterior of the plurality of mobile field devices is similar to the mounting location of the monocular camera 126 on the current mobile field device 123. In some embodiments, the mounting location of the historical monocular cameras on the exterior of the plurality of mobile field devices is different from the mounting location of the monocular camera 126 on the current mobile field device 123. The example of almond orchards is illustrative and not limiting. Other orchards are possible, such as walnuts, pecans, pistachios, etc. Mobile field equipment operating in vineyards are also benefitted by the output data provided by the embodiments of analysis system described herein.

In some embodiments, the AI model 197 producing an instance of output data 173 including an estimate of information not explicitly present in an input data 171 but derivable from the input data 171 includes one or more of the following computational functions: (a) enhancement of the input (e.g., generating a three-dimensional representation of the two-dimensional image included in the input data 171); (b) imputation of missing input (e.g., filling in a missing or obscured section of an image); (c) prediction of future input or other digital data (e.g., predicting a missing image or patch of pixels in the input data 171 when this image or patch of pixels is missing or difficult to read due, for example, to environmental factors that affect the quality of the images recorded by the monocular camera 126; (d) summarization or labeling of the input (e.g., image categorization and labeling of objects included in the images included in the input data 171); (e) any derivative of the computational functions described above; and (f) any combination of the computational functions described above. The examples described above for these computational functions are intended to be illustrative and not limiting.

In some embodiments, a second computational step performed by the code and routines of an AI model 197 is to compute the output data 173 based on a set of parameters whose values are learned by the AI model 197 analyzing examples from the training data 196 in a supervised manner When an AI model 197 learns the set of parameters in supervised manner, this means that the training data 196 provided to the AI model 197 during the learning stage includes labels which are added by the human operator to enhance the learning of the AI model 197.

Figure 4A:
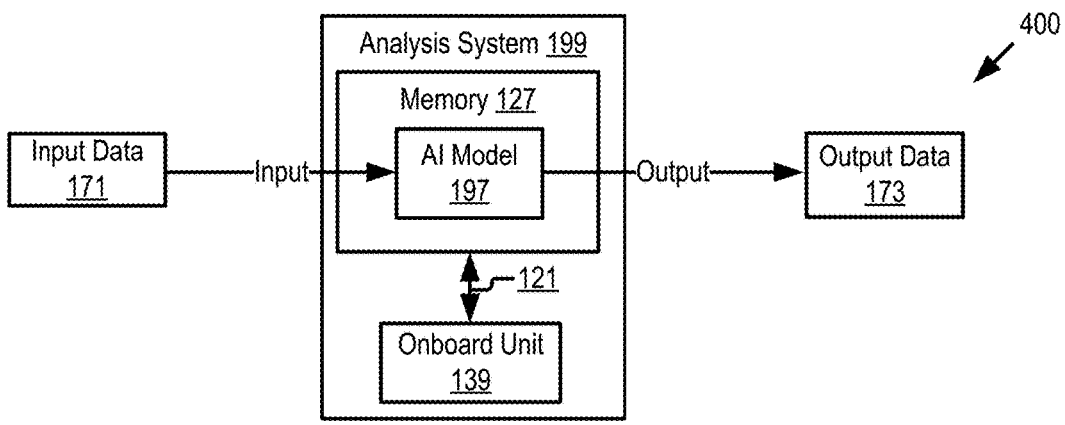
FIG. 4A is a block diagram illustrating a flow process for generating output data based on input data according to some embodiments.

An example of the AI model according to some embodiments includes the AI model 197 depicted in FIGS. 1 and 4A. An example of the training data according to some embodiments includes the training data 196 depicted in FIG. 1.

In some embodiments, the AI model 197 includes code and routines that are operable to perform deep learning (DL) based on the training data 196 analyzed by the AI model 197 during a training phase and use information learned by the AI model 197 when analyzing the input data 171 to produce the output data 173

Autonomous Control System

In some embodiments, the mobile field device 123 includes farm equipment and the autonomous control system 152 includes any hardware and software necessary to render the farm equipment fully autonomous or semi-autonomous.

In some embodiments, the autonomous control system 152 takes a different approach to providing autonomous control capability to the mobile field device 123 when compared to existing technology. Existing technology for providing autonomous control capability navigates the farm equipment by using lasers to locate objects around the field environment where the farm equipment is located. The farm equipment is driven by a controller that controls the steering of the farm equipment. The lasers provide the controller with information about the geometry of the field environment and the obstacles within the field. This approach is similar to the concept utilized by submarines when utilizing sonar. By comparison, the autonomous control system 152 described herein is novel because it includes no lasers. Thus, autonomous control systems 152 that include lasers or rely on lasers are not the same as the autonomous control system 152 described herein. In this way, the autonomous control system may be described as a "laser-less autonomous control system."

Instead of relying on lasers, the autonomous control system 152 is able to control the steering of the mobile field equipment utilizing only a monocular camera 126 that is operable to record two dimensional images (an example of the input data 171) and the analysis system 199 that analyzes these two-dimensional images to generate one or more three-dimensional images that depict the geographic locations of objects (e.g., trees, obstacles, other machines) in the field environment 140 with an accuracy that satisfies a threshold for accuracy described by the threshold data 169 (an example of the output data 173).

In some embodiments, the control subsystem 153 includes a controller that is operable to control the steering of the mobile field device 123. In some embodiments, the control subsystem 153 includes a controller that is communicatively coupled to one or more actuators that are operable to control any functionality provided by the mobile field device 123 (e.g., steering the mobile field device 123, shaking a tree, harvesting crops, etc.) based at least in part on the output data 173 provided by the analysis system 199.

In some embodiments, the control subsystem 153 includes one or more of the following onboard control systems: an adaptive cruise control system (ACC system); an adaptive high beam system; an adaptive light control system; a night vision system; a blind spot monitor; a collision avoidance system; a crosswind stabilization system; a driver drowsiness detection system (e.g., for embodiments that are not fully autonomous); a driver monitoring system; an emergency driver assistance system; a forward collision warning system; an intelligent speed adaption system; a row/path departure warning system; and autopilot. Each of these example control subsystems 153 provide their own features and functionality that may be referred to herein as a "control feature" or "control functionality," respectively. The features and functionality provided by these example control subsystems 153 are also referred to herein as an "autonomous feature" or an "autonomous functionality," respectively.

Connectivity

In some embodiments, system data includes some or all of the digital data described herein. In some embodiments, the communication unit of a mobile field device 123 includes a V2X radio. The V2X radio operates in compliance with a V2X protocol. In some embodiments, the V2X radio is a cellular-V2X radio ("C-V2X radio"). In some embodiments, the V2X radio broadcasts Basic Safety Messages ("BSM" or "safety message" if singular, "BSMs" or "safety messages" if plural). In some embodiments, the safety messages broadcast by the communication unit include some or all of the system data as its payload. In some embodiments, the system data is included in part 2 of the safety message as specified by the Dedicated Short-Range Communication (DSRC) protocol. In some embodiments, the payload includes digital data that describes, among other things, the output data 173 and/or the input data 171.

As used herein, the term "mobile field device" refers to a connected farm equipment having wireless communication capabilities and a link to the network 105. For example, the mobile field device 123 includes a communication unit that enables the autonomous control system 152 to send and receive wireless messages via one or more wireless networks.

In some embodiments, the analysis system 199 includes software installed in an onboard unit 139 (e.g., a graphical processing unit) of a mobile field device 123 having wireless communication capability. The mobile field device 123 is a connected farm equipment that operates in a field environment 140 with N number of other mobile field devices that are also connected farm equipment, where N is any positive whole number. The field environment 140 may include one or more of the following example elements: a mobile field device 123; N other mobile field devices 123; a cloud server 103; and an edge server 198. The edge server 198 may be an element of a stationary computing device that has wireless communication capability. These elements are communicatively coupled to one another via a network 105. In some embodiments, the mobile field devices wirelessly communicate with each other in a point-to-point manner as well as, or instead of, a mesh network configuration. The uplink connectivity can be shared between endpoints and/or with remote endpoints such as a cloud server. Other configurations are possible. The examples provided herein are intended to be illustrative and not limiting.

In some embodiments, the analysis system 199 includes code and routines stored on and executed by a cloud server 103 or an edge server 198.

The mobile field device 123 and the N other mobile field devices 123 may be a human-driven farm equipment, autonomous farm equipment, or a combination of human-driven farm equipment and autonomous farm equipment. In some embodiments, the mobile field device 123 and the other mobile field devices may be equipped with equipment such as a GPS unit and a memory storing GPS data 175. GPS data includes digital data describing the geographic location of the mobile field device 123.

In some embodiments, the autonomous control system 152 includes one or more control subsystems 153 that, collectively or individually, provide sufficient functionality to render the mobile field device 123 an upgraded mobile field device having autonomous control capability. The autonomous control system 152 collects data describing the field environment 140, in particular sensor data 195 including two-dimensional images sourced from a monocular camera 126. The analysis system 199 includes an AI model 197 that uses these images (or the input data 171) to understand the field environment 140 and generate output data 173 that describes the a three-dimensional understanding of the field environment 140 including the locations of objects within the field environment 140 (e.g., the location of a path for the mobile field device 123 to operate within the field environment 140, the location of one or more rows of trees within the field environment 140, and the locations of one or more of the particular trees within the one or more rows). The analysis system 199 outputs the output data 173 to one or more of the control subsystems 153 which are then configured to modify their operation of the mobile field device 123 based on the output data 173. For example, since the output data 173 describes (1) the locations of a path for the mobile field device 123 to operate within the field environment 140, (2) the locations of one or more rows of trees within the field environment 140, and (3) the locations of one or more particular trees within the one or more rows, then then a control subsystem 153 responsible for steering the mobile field device 123 controls the steering o the mobile field device 123 so that the mobile field device 123 stays within the path without colliding with the row of trees or the particular trees within the row. Similarly, a control subsystem 153 responsible for controlling the speed of the mobile field device 123 may modify the speed of the mobile field device 123 based on the output data 173 (slow down or speed up at different geographic locations).

In another example, a first control subsystem 153 responsible for steering may steer the mobile field device 123 that is a tree shaker to a tree, a second control subsystem 153 responsible for speed may ensure that this approach to the tree is slower than the operation of the mobile field device within the path and also that the mobile field device 123 stops moving forward when it is within a predetermined distance from the tree, and a third control system 153 responsible for shaking trees may cause an actuator of the mobile field device 123 to shake the tree so that fruits or nuts fall downward for later harvesting. Each of the first, second, and third control subsystems 153 described in this paragraph provides their functionality using the output data 173 as an input to control the operation of the first, second, and third control subsystems 153 to protect the tree and the mobile field device 123 from damage.

Cellular Vehicle to Everything (C-V2X)

C-V2X is an optional feature of the embodiments described herein. Some of the embodiments described herein utilize C-V2X communications. Some of the embodiments described herein do not utilize C-V2X communications. For example, the embodiments described herein utilize V2X communications other than C-V2X communications. C-V2X is defined as 3GPP direct communication (PC5) technologies that include LTE-V2X, 5G NR-V2X, and future 3GPP direct communication technologies.

Dedicated Short-Range Communication (DSRC) is now introduced. A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a smartphone; a smartwatch; a laptop; a tablet computer; a personal computer; and a wearable device.

In some embodiments, instances of the term "DSRC" as used herein may be replaced by the term "C-V2X." For example, the term "DSRC radio" is replaced by the term "C-V2X radio," the term "DSRC message" is replaced by the term "C-V2X message," and so on.

In some embodiments, instances of the term "V2X" as used herein may be replaced by the term "C-V2X."

In some of these embodiments, some or all of the digital data depicted in FIG. 1 is the payload for one or more C-V2X messages. In some embodiments, the C-V2X message is a BSM.

Vehicular Network

In some embodiments, the analysis system utilizes a vehicular network. A vehicular network includes, for example, one or more of the following: V2V; V2X; vehicle-to-network-to-vehicle (V2N2V); vehicle-to-infrastructure (V2I); C-V2X; any derivative or combination of the networks listed herein; and etc.

Example Overview

In some embodiments, the analysis system is software that is operable, when executed by a processor, to cause the processor to execute one or more of the methods described herein. An example operating environment 100 for the analysis system is depicted in FIG. 1.

In some embodiments, the analysis system 199 is software installed in an onboard unit 139 of a mobile field device 123 having wireless communication capability. For example, the mobile field device 123 includes a communication unit 145. The communication unit 145 includes a wireless radio. For example, the communication unit 145 includes a C-V2X radio. FIG. 1 depicts an example operating environment 100 for the analysis system 199 according to some embodiments.

Example Operative Environment

Embodiments of the analysis system are now described. Referring now to FIG. 1, depicted is a block diagram illustrating an operating environment 100 for an analysis system 199 according to some embodiments. The operating environment 100 is present in a field environment 140. In some embodiments, each of the elements of the operating environment 100 is present in the same field environment 140 at the same time. In some embodiments, some of the elements of the operating environment 100 are not present in the same field environment 140 at the same time.

The field environment 140 includes objects. Examples of objects include one or of the following: a path for the mobile field device 123 to drive within; one or more trees; one or more crops; one or more rows of trees including a canopy of branches (such that the row of trees represents potential points of contact along a X, Y, and Z axis, assuming a Cartesian coordinate system for operating the mobile field device 123 by a controller); one or more rows of crops; irrigation infrastructure; fencing; other mobile field devices; humans; animals; variances in elevation; rocks; debris; potholes, accumulated water, accumulated mud, gravel, construction obstacles; cones; poles; railroad tracks; railroad crossings; roads; roads intersections; tree bases; drivable areas; and any other tangible object that is present in a field environment 140 or otherwise observable or measurable by the monocular camera 126 or some other sensor included in the sensor set.

The operating environment 100 may include one or more of the following elements: a mobile field device 123; a cloud server 103; and an edge server 198. These elements are communicatively coupled to one another via a network 105. Accordingly, the mobile field device 123, the edge server 198, and the cloud server 103 are "endpoints" of the network 105. These elements of the operating environment 100 are depicted by way of illustration. In practice, the operating environment 100 may include one or more of the elements depicted in FIG. 1. For example, the field environment 140 may include a plurality of mobile field devices 123 operating within the field environment 140.

In some embodiments, the mobile field device 123, the edge server 198, and the cloud server 103 include similar elements. For example, each of these elements of the operating environment 100 include their own processor 125, bus 121, memory 127, communication unit 145, processor 125, and the analysis system 199 (optional). These elements of the mobile field device 123, the edge server 198, and the cloud server 103 provide the same or similar functionality regardless of whether they are included in the mobile field device 123, the edge server 198, or the cloud server 103. Accordingly, the descriptions of these elements will not be repeated in this description for each of these endpoints of the network 105.

In some embodiments, the analysis system 199 is an optional element of the cloud server 103; the presence of the analysis system 199 at the cloud server 103 is not necessary for the analysis system 199 of the mobile field device 123 to provide its functionality. All elements depicted in FIG. 1 using a dashed line are optional elements within the endpoint it is depicted within using a dashed line.

In the depicted embodiment, one or more of the mobile field device 123, the edge server 198, and the cloud server 103 store similar digital data. The system data 129 includes digital data that describes some or all of the digital data stored in the memory 127 or otherwise described herein. Different types, amounts, and specific instances of system data 129 may be stored within different endpoints of the network 105 at the same time. For example, the edge server 198 may store different system data 129 than the cloud server 103 although the edge server 198 and the cloud server 103 each store some system data 129 at the same time. In some embodiments, each endpoint of the network 105 may store duplicate instances of the same system data 129 at the same time. For example, each of the mobile field device 123 and the edge server 198 may store a copy of a particular instance of input data 171 at the same time.

The network 105 is a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, millimeter wave (mmWave), LTE, LTE-V2X, LTE-D2D, VOLTE or any other mobile data network or combination of mobile data networks. Further, the network 105 may include one or more IEEE 802.11 wireless networks.

In some embodiments, the network 105 is a V2X network. For example, the network 105 must include a vehicle, such as the mobile field device 123, as an originating endpoint for each wireless communication transmitted by the network 105. An originating endpoint is the endpoint that initiated a wireless communication using the network 105. In some embodiments, the network 105 is a vehicular network. In some embodiments, the network 105 is a C-V2X network.

In some embodiments, the mobile field device 123 is a C-V2X equipped farm equipment. For example, the mobile field device 123 includes a standard-compliant GPS unit that is an element of a sensor set included in the mobile field device 123 and a C-V2X radio that is an element of the communication unit 145. The network 105 may include a C-V2X communication channel shared among the mobile field device 123 and other mobile field devices 123 and/or the edge server 198.

A C-V2X radio is hardware radio that includes a C-V2X receiver and a C-V2X transmitter. The C-V2X radio is operable to wirelessly send and receive C-V2X messages on a band that is reserved for C-V2X messages.

The mobile field device 123 includes farm equipment such as a tree shaker; a tractor; a harvester; a topper; a shaker; a harvest conditioner; and a harvest trolley, or any other field environment 140-based conveyance. In some embodiments, the mobile field device 123 includes an autonomous vehicle or a semi-autonomous vehicle. The farm equipment may not be connected to a network (e.g., the network 105) without the inclusion of the autonomous control system 152 described herein.

In some embodiments, the autonomous control system 152 includes a set of control subsystems 153. In some embodiments, the set of control subsystems 153 includes code and routines that provides sufficient autonomous control capabilities to the mobile field device 123 to render the mobile field device 123 an upgraded mobile field device having autonomous control capability. In some embodiments, the set of control subsystems 153 are collectively elements of an autonomous driving system.

The mobile field device 123 is a connected farm equipment by inclusion of the autonomous control system 152. For example, the mobile field device 123 is communicatively coupled to the network 105 and operable to send and receive messages via the network 105. For example, the mobile field device 123 transmits and receives wireless messages via the network 105.

The mobile field device 123 includes an autonomous control system 152. The autonomous control system 152 includes one or more of the following elements: a processor 125; a sensor set (not pictured); a monocular camera 126; a control subsystem 153; a communication unit 145; an onboard unit 139; a memory 127; and an analysis system 199. These elements may be communicatively coupled to one another via a bus 121. In some embodiments, the communication unit 145 includes a wireless radio.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the mobile field device 123, multiple processors may be included in the mobile field device 123. The processor 125 may include a graphical processing unit. Other processors, operating systems, sensors, displays, and physical configurations may be possible.

In some embodiments, the processor 125 is an element of a processor-based computing device of the mobile field device 123. For example, the mobile field device 123 may include one or more of the following processor-based computing devices and the processor 125 may be an element of one of these devices: an onboard computer; an electronic control unit; a navigation system; autonomous driving system (e.g., a set of control subsystems 153 providing sufficient autonomous functionality to render the mobile field device 123 autonomous); and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the analysis system 199. In some embodiments, the onboard unit 139 is the computer system 200 depicted in FIG. 2. In some embodiments, the onboard unit 139 is an electronic control unit (ECU). In some embodiments, the onboard unit 139 is a graphical processing unit.

The sensor set is an optional feature of the mobile field device 123. The sensor set includes one or more onboard sensors. The sensor set records sensor measurements that describe the mobile field device 123 and/or the physical environment proximate to the mobile field device 123 (e.g., the field environment 140) that includes the mobile field device 123. In some embodiments, the sensor data 195 includes digital data that describes the sensor measurements recorded by the sensor set. In some embodiments, the sensor data 195 includes GPS describing the location of the mobile field device 123 as recorded by a GPS unit included in the sensor set.

In some embodiments, the sensor set may include one or more sensors that are operable to measure the physical environment outside of the mobile field device 123. For example, the sensor set may include cameras, lidar, radar, sonar and other sensors that record one or more physical characteristics of the physical environment that is proximate to the mobile field device 123. Each of these sensors is optional.

For the purpose of clarity, although these sensors may be included in the sensor set, the analysis system 199 is operable to provide the output data 173 using input data 171 generated using solely the two-dimensional images recorded by the monocular camera 126. Thus, the sensor measurements recorded by the sensor set are not necessary to generate the output data 173. In some embodiments, no aspect of the output data 173 is generated using any sensor measurement other than the two-dimensional images recorded by the monocular camera 126.

In some embodiments, the sensor set may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the standard-compliant GPS unit); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an engine sensor; a valve timer; an air-fuel ratio meter; a blind spot meter; a defect detector; a Hall effect sensor, a manifold absolute pressure sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of sensor found within autonomous farm equipment. In some embodiments, the sensor set is operable to record sensor measurements.

In some embodiments, the sensor data 195 includes digital data that describes images or other measurements of the physical environment such as objects (e.g., irrigation hardware, individual trees, any tangible object) and features (e.g., rows of trees, a path for the mobile field device 123, any other understandable concept that is discernible base on the AI model 197 understanding the appearance of the image) of the field environment 140.

In some embodiments, the sensor data 195 includes digital data that describes all of the sensor measurements recorded by the sensor set of the mobile field device 123.

For example, the sensor data 195 includes, among other things, one or more of the following: lidar data (i.e., depth information) recorded by a mobile field device 123; or camera data (i.e., image information) recorded by the mobile field device 123. The lidar data includes digital data that describes depth information about a field environment 140 recorded by a lidar sensor of a sensor set included in the mobile field device 123. The camera data includes digital data that describes the images recorded by the monocular camera 126 included in the mobile field device 123. The depth information and the images describe the field environment 140, including tangible objects in the field environment 140 and any other physical aspects of the field environment 140 that are measurable using a depth sensor and/or the monocular camera 126.

In some embodiments, the sensors of the sensor set are operable to collect sensor data 195. The sensors of the sensor set include any sensors that are necessary to measure and record the measurements described by the sensor data 195. In some embodiments, the sensor data 195 includes any sensor measurements that are necessary to generate the other digital data stored by the memory 127. In some embodiments, the sensor data 195 includes digital data that describes any sensor measurements that are necessary for the analysis system 199 provides its functionality as described herein with reference to the method 300 depicted in FIGS. 3A and 3B and/or the example general method described herein.

The sensor data 195 includes digital data that describes any measurement that is taken by one or more of the sensors of the sensor set.

In some embodiments, the mobile field device 123 includes a standard-compliant GPS unit includes a GPS unit that is compliant with one or more standards that govern the transmission of V2X wireless communications ("V2X communication" if singular, "V2X communications" if plural). For example, some V2X standards require that BSMs are transmitted at intervals by vehicles and that these BSMs must include within their payload GPS data having one or more attributes. In some embodiments, the standard-compliant GPS unit is an element of the sensor set.

An example of an attribute for GPS data is accuracy. In some embodiments, the standard-compliant GPS unit is operable to generate GPS measurements which are sufficiently accurate to describe the location of the mobile field device 123 within 1.5 meters of the actual position of the mobile field device 123 in the real-world.

The communication unit 145 transmits and receives data to and from a network 105 or to another communication channel. In some embodiments, the analysis system 199 is operable to control all or some of the operation of the communication unit 145.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); or another suitable wireless communication method.

In some embodiments, the communication unit 145 includes a radio that is operable to transmit and receive V2X messages via the network 105. For example, the communication unit 145 includes a radio that is operable to transmit and receive any type of V2X communication described above for the network 105.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

Figure 3A:
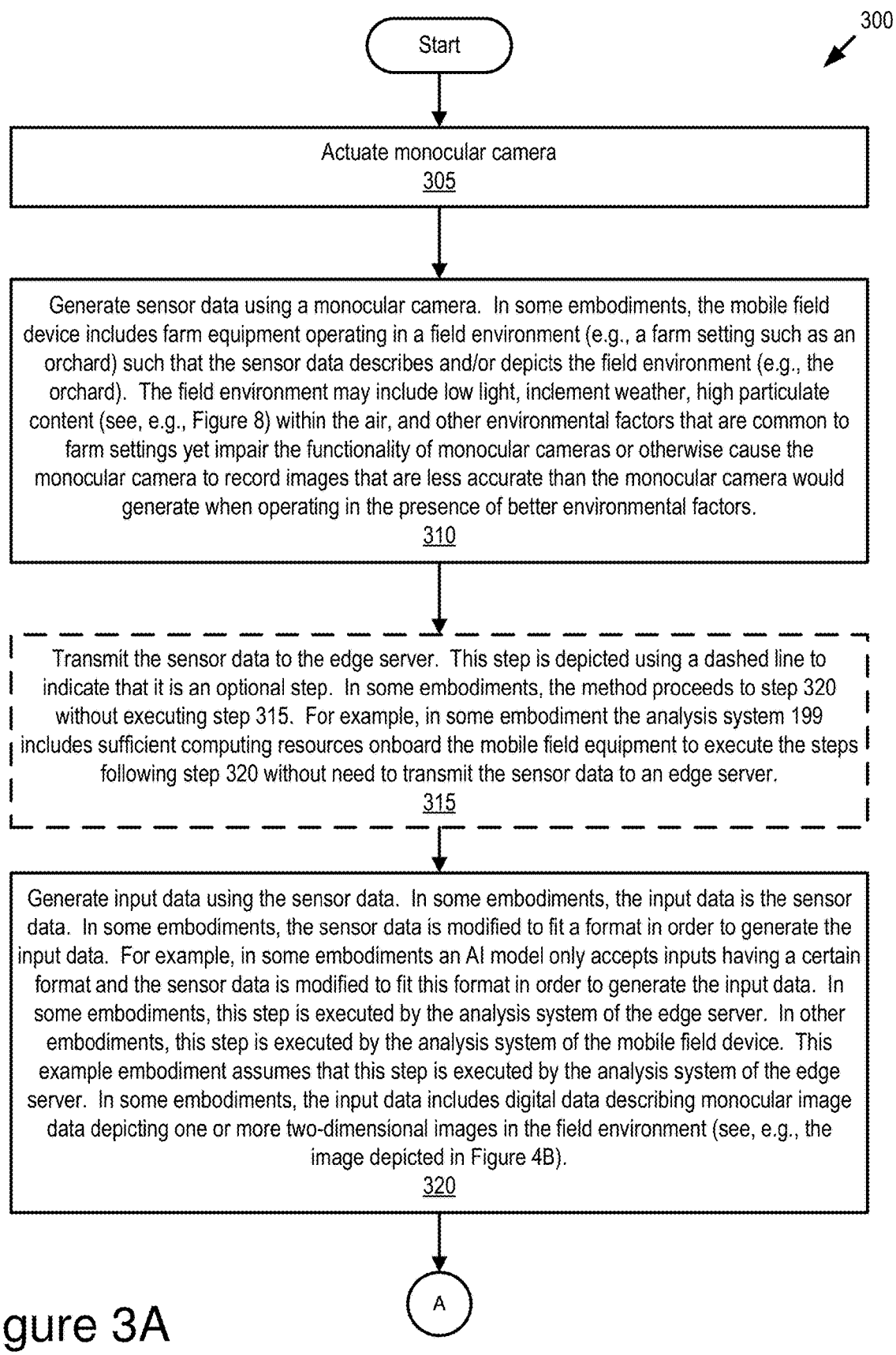
FIGS. 3A and 3B are a flowchart of an example method for improving the operation of an autonomous control system using output data generated based on input data according to some embodiments.
Figure 3B:
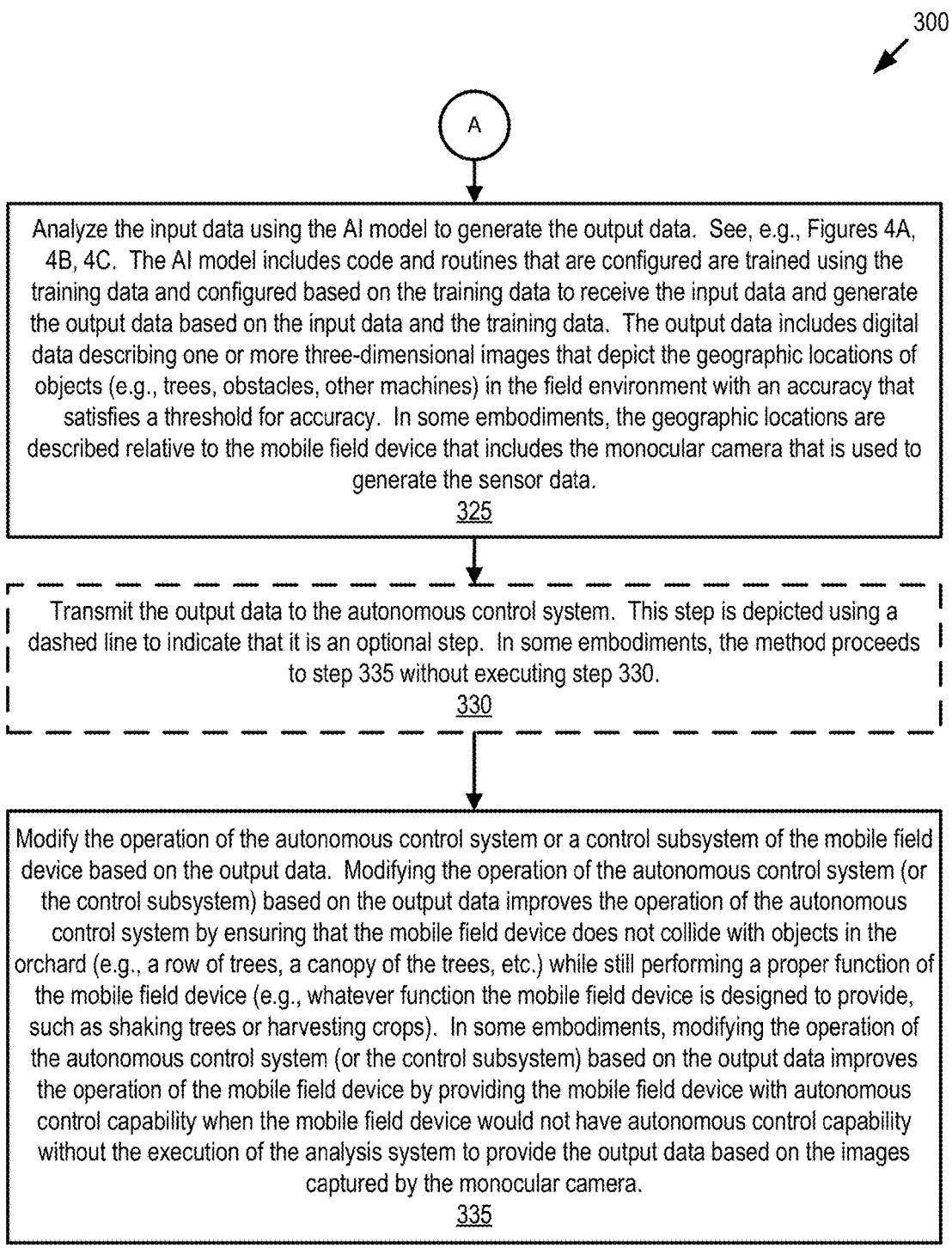

In some embodiments, the communication unit 145 includes a V2X radio. The V2X radio is a hardware unit that includes one or more transmitters and one or more receivers that is operable to send and receive any type of V2X message. In some embodiments, the V2X radio is a C-V2X radio that is operable to send and receive C-V2X messages. In some embodiments, the C-V2X radio is operable to send and receive C-V2X messages on the upper 30 MHz of the 5.9 GHz band (i.e., 5.895-5.925 GHZ). In some embodiments, some or all of the wireless messages described above with reference to the method 300 depicted in FIGS. 3A and 3B are transmitted by the C-V2X radio on the upper 30 MHz of the 5.9 GHz band (i.e., 5.895-5.925 GHZ) as directed by the analysis system 199.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the input data 171; the threshold data 169; the output data 173; the analysis data 181; the GUI data 187 (optional); the metrics data 185; the training data 196; the AI model 197; the GPS data 175; the sensor data 195; the certification submission data 161; the certification analysis data 163; and the certification decision data 165. The system data 129 includes some or all of this digital data. In some embodiments, digital data describing the wireless messages which are described herein are also stored in the memory 127. The above-described elements of the memory 127 were described above, and so, those descriptions will not be repeated here.

Some or all of this digital data can be organized in a data structure that is stored in the memory 127 in some embodiments.

In some embodiments, the control subsystem 153 includes an onboard system that is operable to identify one or more factors (e.g., using one or more onboard sensors and/or the output data 173) affecting the mobile field device 123 and modify (or control) the operation of the mobile field device 123 to respond to these identified factors. Described generally, a process of the control subsystem 153 providing control functionality includes the process of: (1) identifying one or more factors affecting the mobile field device 123 based on the output data 173 provided by the analysis system 199 (and optionally the sensor data 195); and (2) modifying the operation of the mobile field device 123, or some component of the mobile field device 123, based on these identified factors. Thus, the analysis system 199 beneficially improves the operation of the control subsystem 153 by the provision of the output data 173.

In some embodiments, the autonomous control system 152 includes any software or hardware included in the mobile field device 123 that renders the mobile field device 123 to be an upgraded mobile field device or a retrofitted mobile field device (e.g., a farm equipment having autonomous control capability). In some embodiments, an autonomous control system 152 includes a collection of control subsystems 153 which provides sufficient control functionality to the mobile field device 123 to render the mobile field device 123 an upgraded mobile field device or a retrofitted mobile field device (e.g., a farm equipment having autonomous control capability).

In some embodiments, the analysis system 199 includes code and routines that are operable, when executed by the processor 125, to execute one or more steps of the example general method described herein. In some embodiments, the analysis system 199 includes code and routines that are operable, when executed by the processor 125, to execute one or more steps of the method 300 described below with reference to FIGS. 3A and 3B. In some embodiments, the analysis system 199 includes code and routines that are operable, when executed by the processor 125, to execute one or more steps of the method 900 described below with reference to FIG. 9.

Figure 2:
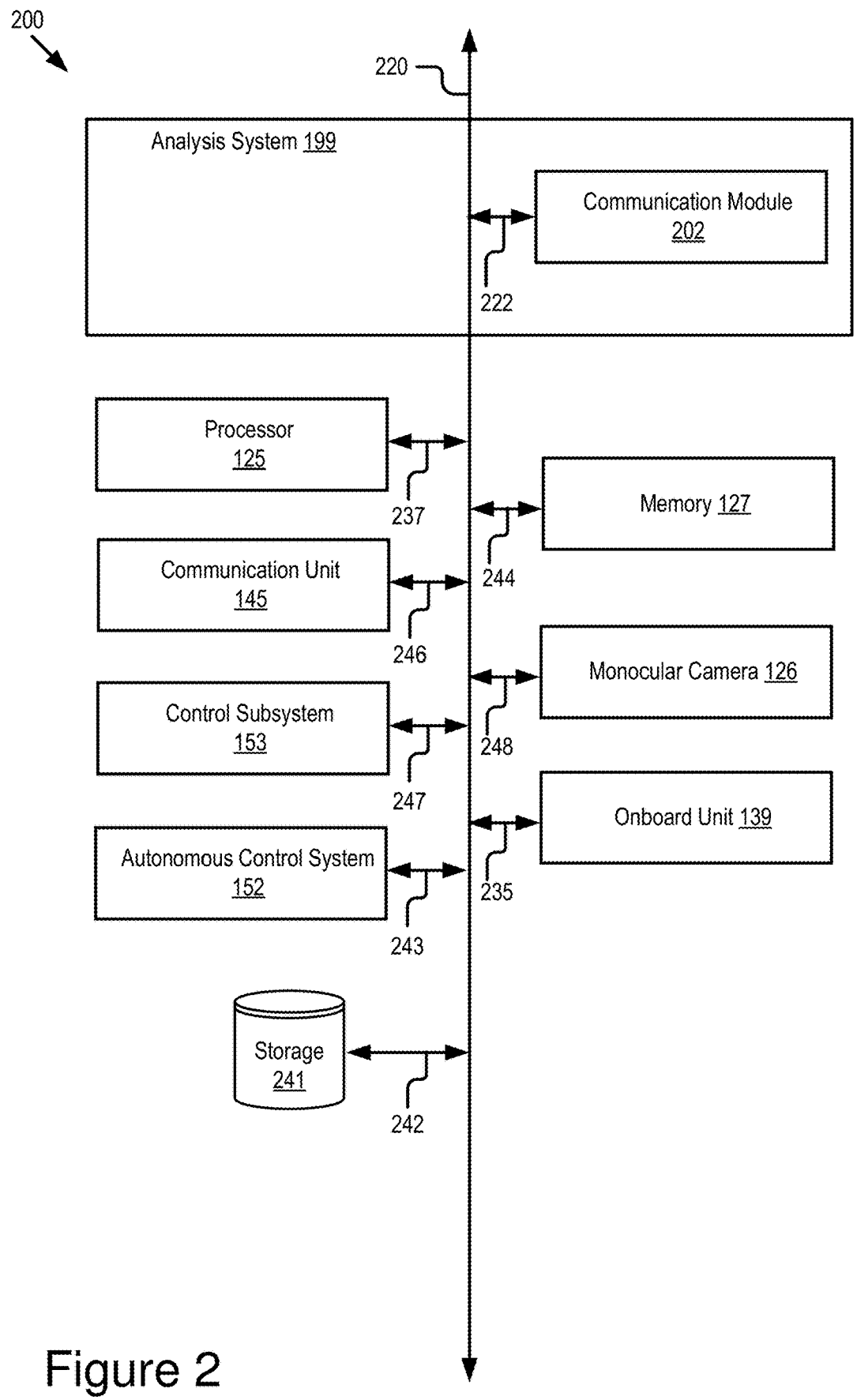
FIG. 2 is a block diagram illustrating an example computer system including an analysis system according to some embodiments.

An example embodiment of the analysis system 199 is depicted in FIG. 2. This embodiment is described in more detail below.

In some embodiments, the analysis system 199 is an element of the onboard unit 139 or some other onboard computer system. In some embodiments, the analysis system 199 includes code and routines that are stored in the memory 127 and executed by the processor 125 or the onboard unit 139. In some embodiments, the analysis system 199 is an element of an onboard unit 139 of the mobile field device 123 which executes the analysis system 199 and controls the operation of one or more control subsystems 153 of the mobile field device 123 based at least in part on the output data 173 which is outputted from executing the analysis system 199.

In some embodiments, the analysis system 199 is implemented using hardware including a field-programmable gate array ("FPGA") or an application-specific integrated circuit ("ASIC"). In some other embodiments, the analysis system 199 is implemented using a combination of hardware and software.

The field environment 140 includes some or all of the tangible and/or measurable qualities described above with reference to the sensor data 195. The field environment 140 was described above with reference to the example general method, and so, that description will not be repeated here.

In some embodiments, the edge server 198 is a connected processor-based computing device that includes an instance of the analysis system 199 and the other elements described above with reference to the mobile field device 123 (e.g., a processor 125, a memory 127 storing the system data 129, a communication unit 145, etc.).

In some embodiments, the edge server 198 includes one or more of the following elements: a hardware server; a personal computer; a laptop; a device such as a roadside unit; or any other processor-based connected device that includes an instance of the analysis system 199 and a non-transitory memory that stores some or all of the digital data that is stored by the memory 127 of the mobile field device 123 or otherwise described herein. For example, the memory 127 stores the system data 129. The system data 129 includes some or all of the digital data depicted in FIG. 1 as being stored by the memory 127. As depicted in FIG. 1, the memory 127 of the edge server 198 stores various types of digital data. This digital data is described above with reference to the example general method, and so, those descriptions will not be repeated here.

In some embodiments, the edge server 198 includes a backbone network. In some embodiments, the edge server 198 is operable to provide any other functionality described herein. For example, the edge server 198 is operable to execute some or all of the steps of the methods described herein.

In some embodiments, the cloud server 103 one or more of the following: a hardware server; a personal computer; a laptop; a device such as a roadside unit; or any other processor-based connected device that includes an instance of the analysis system 199 and a non-transitory memory that stores some or all of the digital data that is stored by the memory 127 of the mobile field device 123 or otherwise described herein.

In some embodiments, the cloud server 103 includes one or more of the following elements: an instance of the certification system 188; an instance of the analysis system 199 (optional); an electronic display device 149; a communication unit 145; a processor 125; and a memory 127 storing system data 129. The functionality of these elements was described above with reference to the mobile field device 123 and the example general method, and so, those descriptions will not be repeated here.

In some embodiments, the cloud server 103 is operable to provide any other functionality described herein. For example, the cloud server 103 is operable to execute some or all of the steps of one or more of the methods described herein. For example, in some embodiments, the certification system 188 of the cloud server 103 includes code and routines that are operable, when executed by the processor 125 of the cloud server 103, to cause the processor 125 to execute one or more steps of the method 700 depicted in FIG. 7.

In some embodiments, a human user seeks to certify their design for an autonomous control system such as the autonomous control system 152 and so the human user submits a request for certification to a website or some other electronic interface provided by the cloud server 103 in which the certification submission data 161 is uploaded to the cloud server 103. The certification system 188 then executes the method 700 based on the certification submission data 161 to determine whether the design is certifiable for use with the analysis system 199. If the certification system 188 determines that the design is certified, then the human user is provided access to the code and routines of the analysis system 199 so that the analysis system 199 may then be incorporated in the design. In some embodiments, the human user is provided with access to an application programming interface (API) that is operable to communicate with an instance of the analysis system 199 that is stored on computing hardware such as the edge server 198 so that the code and routines of the analysis system 199 is not provided to the human user while the functionality of the analysis system 199 is accessible by their design using the API. If the certification system 188 determines that the design is certified, then the human user is not provided access to the code and routines of the analysis system 199 or an API and is instead provided with feedback about how to modify the design to receive access to the code and routines of the analysis system 199 or the API.

Figure 5:
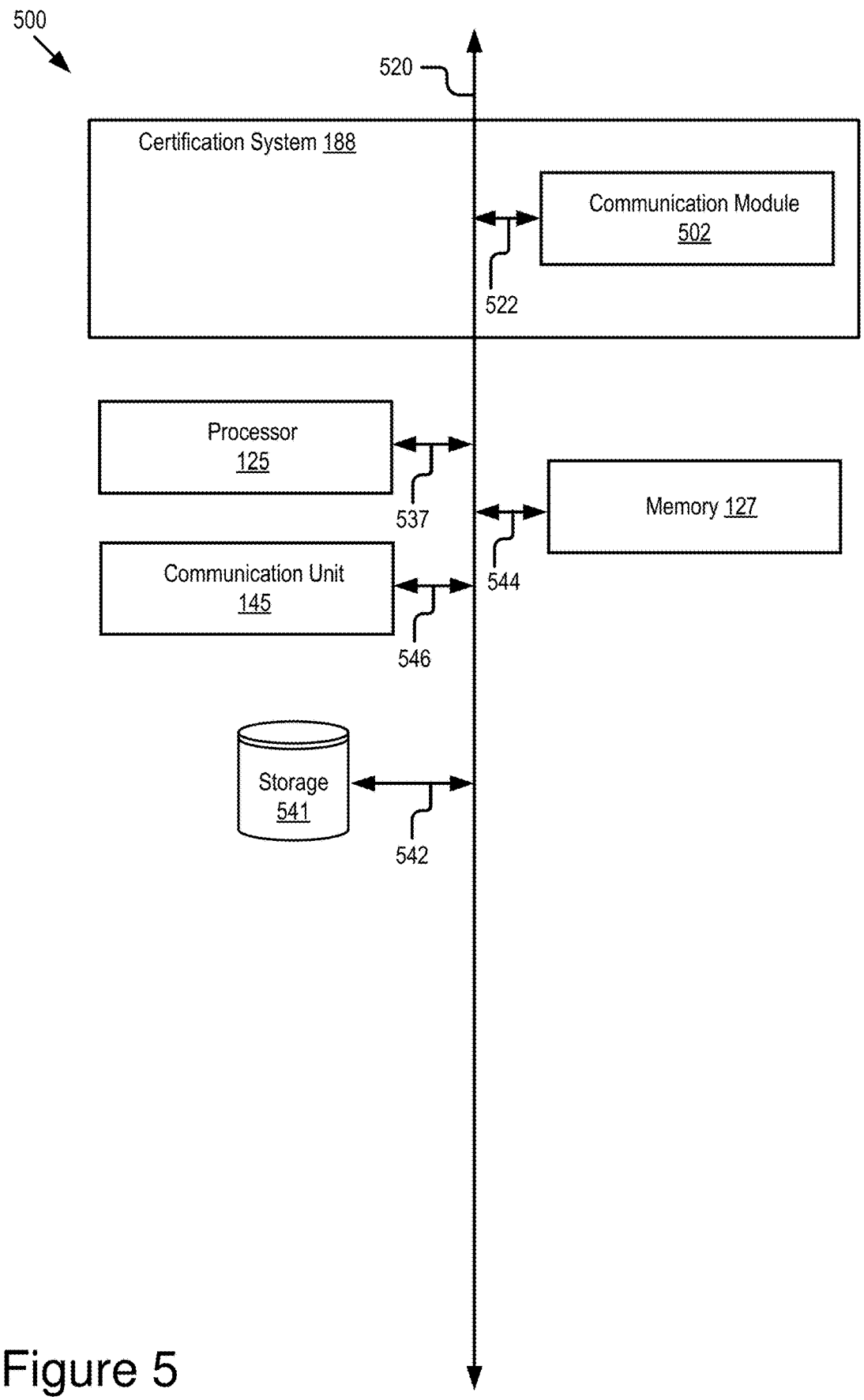
FIG. 5 is a block diagram illustrating an example computer system including a certification system according to some embodiments.

An example embodiment of the certification system 188 is depicted in FIG. 5. This embodiment is described in more detail below.

In some embodiments, the certification system 188 is implemented using hardware including an FPGA or an ASIC. In some other embodiments, the certification system 188 is implemented using a combination of hardware and software.

In some embodiments, the wireless messages described herein are encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the analysis system 199 includes encryption keys for encrypting wireless messages and decrypting the wireless messages described herein.

Referring now to FIG. 2, depicted is a block diagram illustrating an example computer system 200 including an analysis system 199 according to some embodiments.

Figure 9:
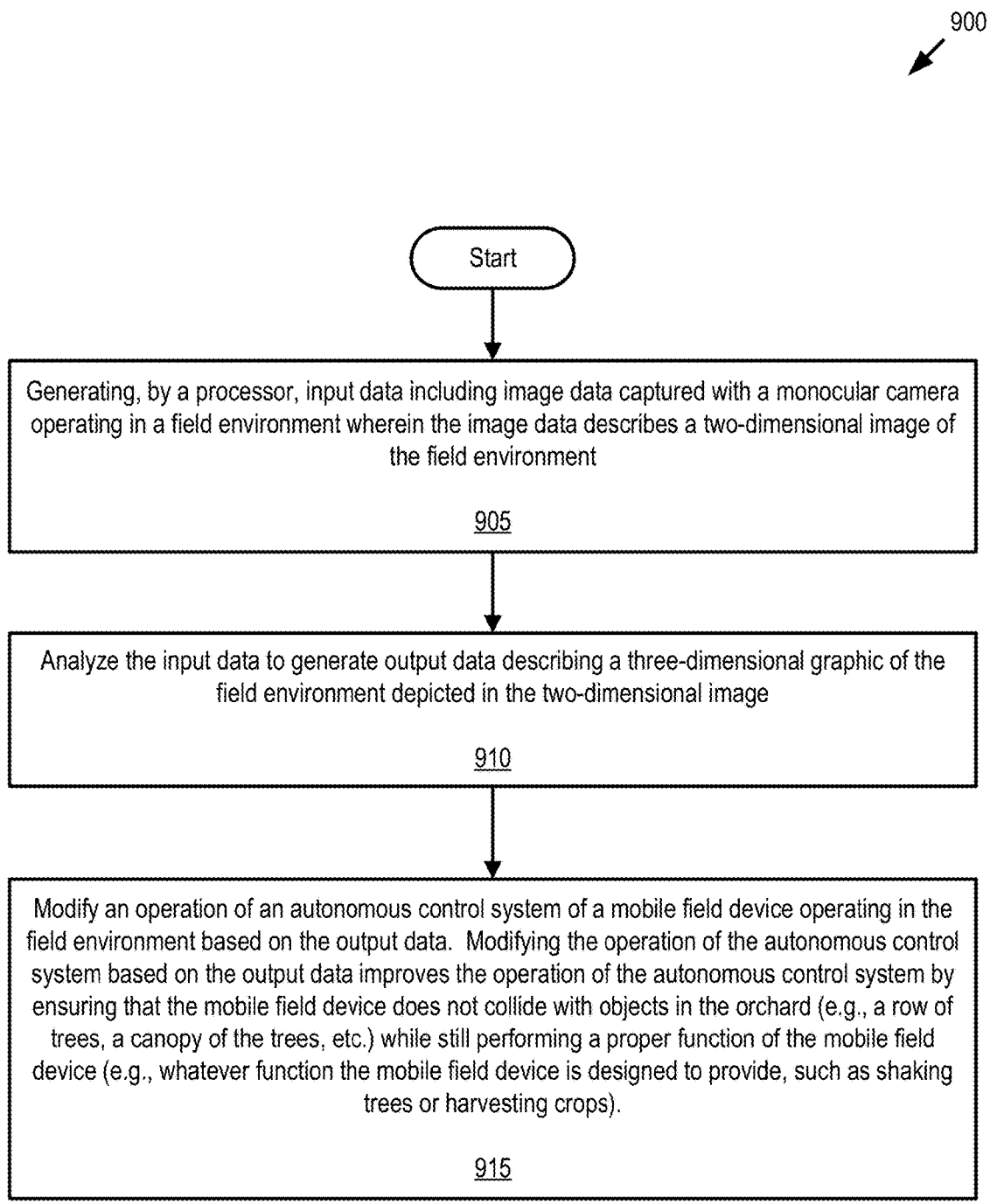
FIG. 9 is a flowchart of an example method for improving the operation of an autonomous control system using output data generated based on input data according to some embodiments.

In some embodiments, the computer system 200 may include a special-purpose computer system that is programmed to perform one or more of the following: one or more steps of the method 300 described herein with reference to FIG. 3; one or more steps of the method 900 described herein with reference to FIG. 9; and the example general method described herein.

In some embodiments, the computer system 200 may include a processor-based computing device. For example, the computer system 200 may be an onboard unit 139 of the mobile field device 123. In another example, the computer system 200 is the autonomous control system 152.

The computer system 200 may include one or more of the following elements according to some examples: the analysis system 199; a processor 125; a communication unit 145; a control subsystem 153; an autonomous control system 152; a memory 127; a monocular camera 126; an onboard unit 139; and a storage 241. The components of the computer system 200 are communicatively coupled by a bus 220.

In some embodiments, the computer system 200 includes additional elements such as those depicted in FIG. 1 as elements of the analysis system 199.

In the illustrated embodiment, the processor 125 is communicatively coupled to the bus 220 via a signal line 237. The communication unit 145 is communicatively coupled to the bus 220 via a signal line 246. The control subsystem 153 is communicatively coupled to the bus 220 via a signal line 247. The autonomous control system 152 is communicatively coupled to the bus 220 via a signal line 243. The storage 241 is communicatively coupled to the bus 220 via a signal line 242. The memory 127 is communicatively coupled to the bus 220 via a signal line 244. The monocular camera 126 is communicatively coupled to the bus 220 via a signal line 248. The autonomous control system 152 is communicatively coupled to the bus 220 via a signal line 243. The onboard unit 139 is communicatively coupled to the bus 220 via a signal line 235.

The following elements of the computer system 200 were described above with reference to FIG. 1, and so, these descriptions will not be repeated here: the analysis system 199; a processor 125; a communication unit 145; a control subsystem 153; an autonomous control system 152; a memory 127; a monocular camera 126; and an onboard unit 139.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the analysis system 199 includes code and routines that are operable, when executed by the processor 125, to cause the processor 125 to execute one or more steps of the method 300 described herein with reference to FIG. 3. In some embodiments, the analysis system 199 includes code and routines that are operable, when executed by the processor 125, to cause the processor 125 to execute one or more steps of the method 700 described herein with reference to FIG. 7. In some embodiments, the analysis system 199 includes code and routines that are operable, when executed by the processor 125, to cause the processor 125 to execute one or more steps of the example general method.

In the illustrated embodiment shown in FIG. 2, the analysis system 199 includes a communication module 202.

The communication module 202 can be software including routines for handling communications between the analysis system 199 and other components of the computer system 200. In some embodiments, the communication module 202 can be a set of instructions executable by the processor 125 to provide the functionality described below for handling communications between the analysis system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100.

In some embodiments, the communication module 202 receives data from components of the analysis system 199 and stores the data in one or more of the storage 241 and the memory 127.

In some embodiments, the communication module 202 may handle communications between components of the analysis system 199 or the computer system 200.

Referring now to FIGS. 3A and 3B, depicted is a flowchart of an example method 300 according to some embodiments. The method 300 includes step 305, step 310, step 315, and 320 as depicted in FIG. 3A and step 325, step 330, and step 335 as depicted in FIG. 3B. The steps of the method 300 may be executed in any order, and not necessarily those depicted in FIGS. 3A and 3B. In some embodiments, one or more of the steps are skipped or modified in ways that are described herein or known or otherwise determinable by those having ordinary skill in the art.

Referring now to FIG. 4A, depicted is a block diagram illustrating a flow process 400 for generating an instance of output data 173 based on an instance of input data 171 inputted to the analysis system 199 according to some embodiments. In some embodiments, the analysis system 199 includes an AI model 197 stored on a memory 127. The AI model 197 is executed by an onboard unit 139 that is communicatively coupled to the memory 127 to access and execute the AI model 197 via a bus 121.

Figure 4B:
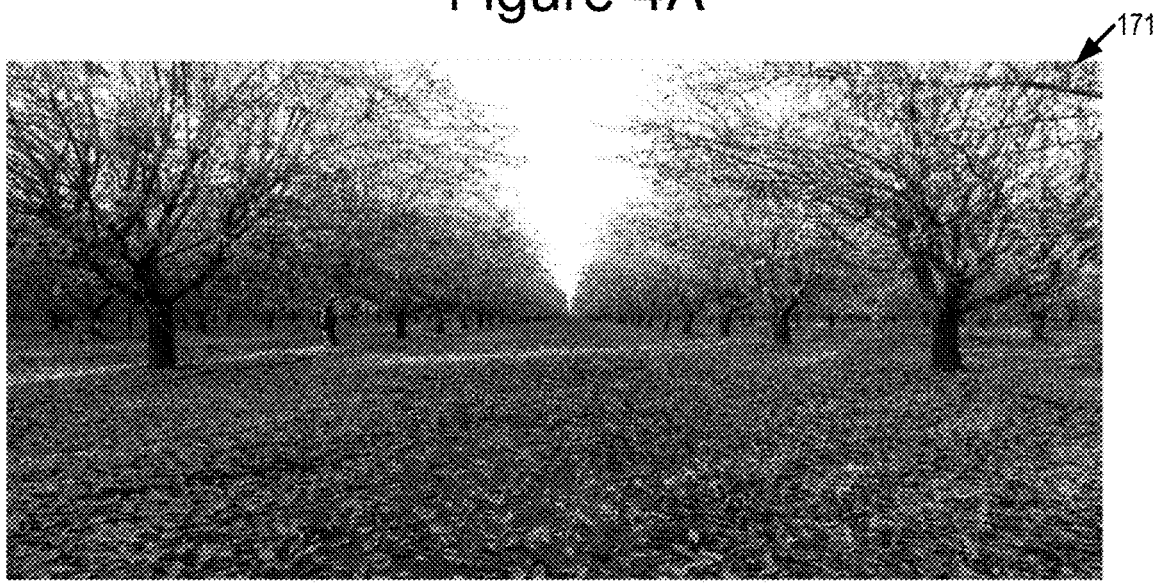
FIG. 4B is a block diagram illustrating an example of input data according to some embodiments.

Referring now to FIG. 4B, depicted is a block diagram illustrating an example of an instance of input data 171 according to some embodiments.

Figure 4C:
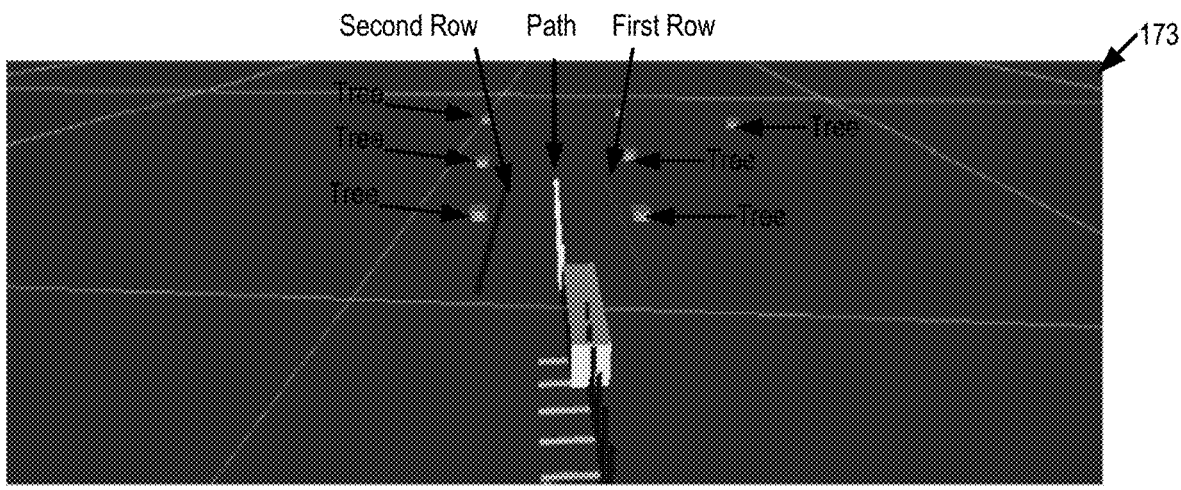
FIG. 4C is a block diagram illustrating an example of output data according to some embodiments.

Referring now to FIG. 4C, depicted is a block diagram illustrating an example of an instance of output data 173 according to some embodiments.

Referring now to FIG. 5, depicted is a block diagram illustrating an example computer system 500 including a certification system 188 according to some embodiments.

In some embodiments, the computer system 500 may include a special-purpose computer system that is programmed to perform one or more of the following: one or more steps of the method 700 described herein with reference to FIG. 7; and the example general method described herein.

In some embodiments, the computer system 500 may include a processor-based computing device. For example, the computer system 500 may be a hardware server device included in a server farm.

The computer system 500 may include one or more of the following elements according to some examples: the certification system 188; a processor 125; a communication unit 145; and a memory 127. The components of the computer system 200 are communicatively coupled by a bus 520.

In some embodiments, the computer system 500 includes additional elements such as those depicted in FIG. 1.

In the illustrated embodiment, the processor 125 is communicatively coupled to the bus 520 via a signal line 537. The communication unit 145 is communicatively coupled to the bus 520 via a signal line 546. The storage 541 is communicatively coupled to the bus 520 via a signal line 542. The memory 127 is communicatively coupled to the bus 520 via a signal line 544.

The following elements of the computer system 200 were described above with reference to FIG. 1, and so, these descriptions will not be repeated here: the certification system 188; a processor 125; a communication unit 145; and a memory 127.

The storage 541 is similar to the storage 241 described above with reference to FIG. 2, and so, that description will not be repeated here.

In some embodiments, the certification system 188 includes code and routines that are operable, when executed by the processor 125, to cause the processor 125 to execute one or more steps of the method 700 described herein with reference to FIG. 7. In some embodiments, the analysis system 199 includes code and routines that are operable, when executed by the processor 125, to cause the processor 125 to execute one or more steps of the example general method.

In the illustrated embodiment shown in FIG. 5, the certification system 188 includes a communication module 502.

The communication module 502 can be software including routines for handling communications between the analysis system 199 and other components of the computer system 500. In some embodiments, the communication module 502 can be a set of instructions executable by the processor 125 to provide the functionality described below for handling communications between the certification system 188 and other components of the computer system 500. In some embodiments, the communication module 502 can be stored in the memory 127 of the computer system 500 and can be accessible and executable by the processor 125. The communication module 502 may be adapted for cooperation and communication with the processor 125 and other components of the computer system 500 via signal line 522.

The communication module 502 sends and receives data, via the communication unit 145, to and from one or more elements of the operating environment 100.

In some embodiments, the communication module 502 receives data from components of the certification system 188 and stores the data in one or more of the storage 541 and the memory 127.

In some embodiments, the communication module 502 may handle communications between components of the certification system 188 or the computer system 500.

Referring now to FIG. 6, depicted is a block diagram illustrating an example of threshold data 169 according to some embodiments.

Referring now to FIG. 7, depicted is a flowchart of an example method 700 for certifying an autonomous control system according to some embodiments. The method 700 includes step 705, step 710, step 715, and step 720 as depicted in FIG. 7. The steps of the method 700 may be executed in any order, and not necessarily those depicted in FIG. 7. In some embodiments, one or more of the steps are skipped or modified in ways that are described herein or known or otherwise determinable by those having ordinary skill in the art.

Referring now to FIG. 8, depicted is a block diagram illustrating an example of environmental factors 800 affecting the quality of sensor data recorded by a monocular camera according to some embodiments.

Referring now to FIG. 9, depicted is a flowchart of an example method 900 for improving the operation of an autonomous control system using output data generated based on input data according to some embodiments. The method 900 includes step 905, step 910, and step 915 as depicted in FIG. 9. The steps of the method 900 may be executed in any order, and not necessarily those depicted in FIG. 9. In some embodiments, one or more of the steps are skipped or modified in ways that are described herein or known or otherwise determinable by those having ordinary skill in the art.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A analysis system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the analysis system to become coupled to other analysis systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
capturing, as an autonomous harvesting machine operates in an orchard, image data of trees in a tree row, wherein:
the image data is captured with a monocular camera and comprising a series of monocular images; and
the image data comprises a two-dimensional representation of the trees in the tree row;
inputting the image data in a graphic generation model, the graphic generation model configured to:
determine positions of each tree in the tree row in three dimensions using the series of monocular images; and
generate output data comprising a three-dimensional graphic, the three-dimensional graphic comprising a representation of each tree in the tree row at their determined positions; and
modifying an operation of the autonomous harvesting machine operating in the tree row based on the output data comprising the three-dimensional graphic.

2. The method of claim 1, wherein the autonomous harvesting machine is a tree shaker.

3. The method of claim 1, wherein:
the orchard includes trees in the row and a path for the autonomous harvesting machine to operate within, and
the output data informs an autonomous control system of the autonomous harvesting machine how to operate within the path without colliding with the trees.

4. The method of claim 3, wherein:
the row of trees includes a canopy, and
the output data informs the autonomous control system how to operate within the path without colliding with the canopy.

5. The method of claim 1, wherein the monocular camera includes a 1 to 50 megapixel image sensor.

6. The method of claim 1, wherein a processor executing the graphic generation model includes a graphical processor unit.

7. The method of claim 6, wherein the graphical processor unit is operable to process 4 to 1,000 tera operations per second.

8. The method of claim 1, wherein:
the method is executed by a software module that is certified by a third party to operate using input data generated by the monocular camera which includes a 1 to 50 megapixel image sensor, and
the software module is certified by the third party to process the image data to generate the output data when executed by a graphical processing unit that is operable to processor 4 to 1,000 tera operations per second.

9. The method of claim 1, wherein the output data providing the three-dimensional representation of each tree in the tree row at their determined position locates each tree within a threshold level of accuracy.

10. The method of claim 1, wherein the generated three-dimensional representation does not include a picture of the autonomous harvesting machine as it appears in real-life.

11. A autonomous harvesting machine comprising:
one or more processors; and
a non-transitory computer-readable storage medium; storing computer program instructions, the computer program instructions, when executed by the one or more processors, causing the one or more processors to:
capture, as the autonomous harvesting machine operates in an orchard, image data of trees in a tree row, wherein:
the image data is captured with a monocular camera and comprising a series of monocular images; and
the image data comprises a two-dimensional representation of the trees in the tree row;
input the image data in a graphic generation model, the graphic generation model configured to:
determine positions of each tree in the tree row in three dimensions using the series of monocular images; and
generate output data comprising a three-dimensional graphic, the three-dimensional graphic comprising a representation of each tree in the tree row at their determined positions; and
modify an operation of the autonomous harvesting machine operating in the tree row based on the output data comprising the three-dimensional graphic.

12. The autonomous harvesting machine of claim 11, wherein the autonomous harvesting machine a tree shaker.

13. The autonomous harvesting machine of claim 11, wherein:
the orchard includes trees in the row and a path for the autonomous harvesting machine to operate within, and
the output data informs an autonomous control system of the autonomous harvesting machine how to operate within the path without colliding with the trees.

14. The autonomous harvesting machine of claim 13, wherein:
the row of trees includes a canopy, and the output data informs the autonomous control system how to operate within the path without colliding with the canopy.

15. The autonomous harvesting machine of claim 11, wherein the monocular camera includes a 1 to 50 megapixel image sensor.

16. The autonomous harvesting machine of claim 11, wherein the processor includes a graphical processing unit.

17. The autonomous harvesting machine of claim 16, wherein the graphical processing unit is operable to processor 4 to 1,000 tera operations per second.

18. A non-transitory computer-readable storage medium soring computer program instructions that, when executed by a processor, cause the processor to:
 capture, as an autonomous harvesting machine operates in an orchard, image data of trees in a tree row, wherein:
  the image data is captured with a monocular camera and comprising a series of monocular images; and
  the image data comprises a two-dimensional representation of the trees in the tree row;
 input the image data in a graphic generation model, the graphic generation model configured to:
  determine positions of each tree in the tree row in three dimensions using the series of monocular images; and
  generate output data comprising a three-dimensional graphic, the three-dimensional graphic comprising a representation of each tree in the tree row at their determined positions; and
 modify an operation of the autonomous harvesting machine operating in the tree row based on the output data comprising the three-dimensional graphic.

* * * * *